(12) United States Patent
Kawachi

(10) Patent No.: US 10,748,545 B2
(45) Date of Patent: Aug. 18, 2020

(54) INTERACTIVE ELECTRONIC DEVICE CONTROL SYSTEM, INTERACTIVE ELECTRONIC DEVICE, AND INTERACTIVE ELECTRONIC DEVICE CONTROLLING METHOD

(71) Applicants: HISENSE VISUAL TECHNOLOGY CO., LTD., Qingdao, Shandong (CN); Toshiba Visual Solutions Corporation, Misawa-Shi, Aomori OT (JP)

(72) Inventor: Reiko Kawachi, Nishitama Tokyo (JP)

(73) Assignees: HISENSE VISUAL TECHNOLOGY CO., LTD., Qingdao (CN); TOSHIBA VISUAL SOLUTIONS CORPORATION, Misawa-Shi (JP)

( * ) Notice: Subject to any disclaimer, the term of this patent is extended or adjusted under 35 U.S.C. 154(b) by 206 days.

(21) Appl. No.: 15/891,234

(22) Filed: Feb. 7, 2018

(65) Prior Publication Data

US 2019/0103116 A1   Apr. 4, 2019

(30) Foreign Application Priority Data

Oct. 2, 2017 (JP) .................. 2017-193057

(51) Int. Cl.
*H04L 12/28* (2006.01)
*G10L 17/22* (2013.01)
*G10L 15/22* (2006.01)
*G06F 21/32* (2013.01)
*G06F 3/16* (2006.01)

(52) U.S. Cl.
CPC .............. *G10L 17/22* (2013.01); *G06F 3/167* (2013.01); *G06F 21/32* (2013.01); *G10L 15/22* (2013.01); *H04L 12/282* (2013.01); *G10L 2015/223* (2013.01); *H04L 2012/2841* (2013.01)

(58) Field of Classification Search
CPC ...................................... H04W 12/06
See application file for complete search history.

(56) References Cited

U.S. PATENT DOCUMENTS 6,963,759 B1    11/2005   Gerson
2012/0149343 A1*  6/2012  Sanka ................... H04M 11/08
                                                    455/413
2013/0252585 A1*  9/2013  Moshir .................. G06F 21/35
                                                    455/411

(Continued)

FOREIGN PATENT DOCUMENTS

JP    2002-132292 A    5/2002
JP    2003-114694 A    4/2003

(Continued)

*Primary Examiner* — Michael N Opsasnick
(74) *Attorney, Agent, or Firm* — Hauptman Ham, LLP

(57) ABSTRACT

According to one embodiment, an interactive electronic device control system includes an interactive electronic device and an authentication manager. The interactive electronic device sends input voice data to a voice recognition service server and receives a response generated based at least in part on a result of recognizing the voice data by the voice recognition service server and the authentication manager authenticates a mobile terminal connected to the interactive electronic device via a network as an authenticated user.

6 Claims, 18 Drawing Sheets

(56) References Cited

U.S. PATENT DOCUMENTS

| | | | | |
|---|---|---|---|---|
| 2014/0108801 A1* | 4/2014 | McBride | ............ | H04L 63/0807 |
| | | | | 713/168 |
| 2014/0278438 A1 | 9/2014 | Hart et al. | | |
| 2015/0072654 A1* | 3/2015 | Moshir | ................ | H04W 12/08 |
| | | | | 455/411 |
| 2016/0285849 A1* | 9/2016 | McBride | ............ | H04L 63/0807 |
| 2017/0025125 A1 | 1/2017 | Alvarez Guevara | | |

FOREIGN PATENT DOCUMENTS

| | | |
|---|---|---|
| JP | 2012-108557 A | 6/2012 |
| JP | WO2014/103035 A1 | 7/2014 |
| JP | 2016-519805 A | 7/2016 |
| JP | 2017-027049 A | 2/2017 |

\* cited by examiner

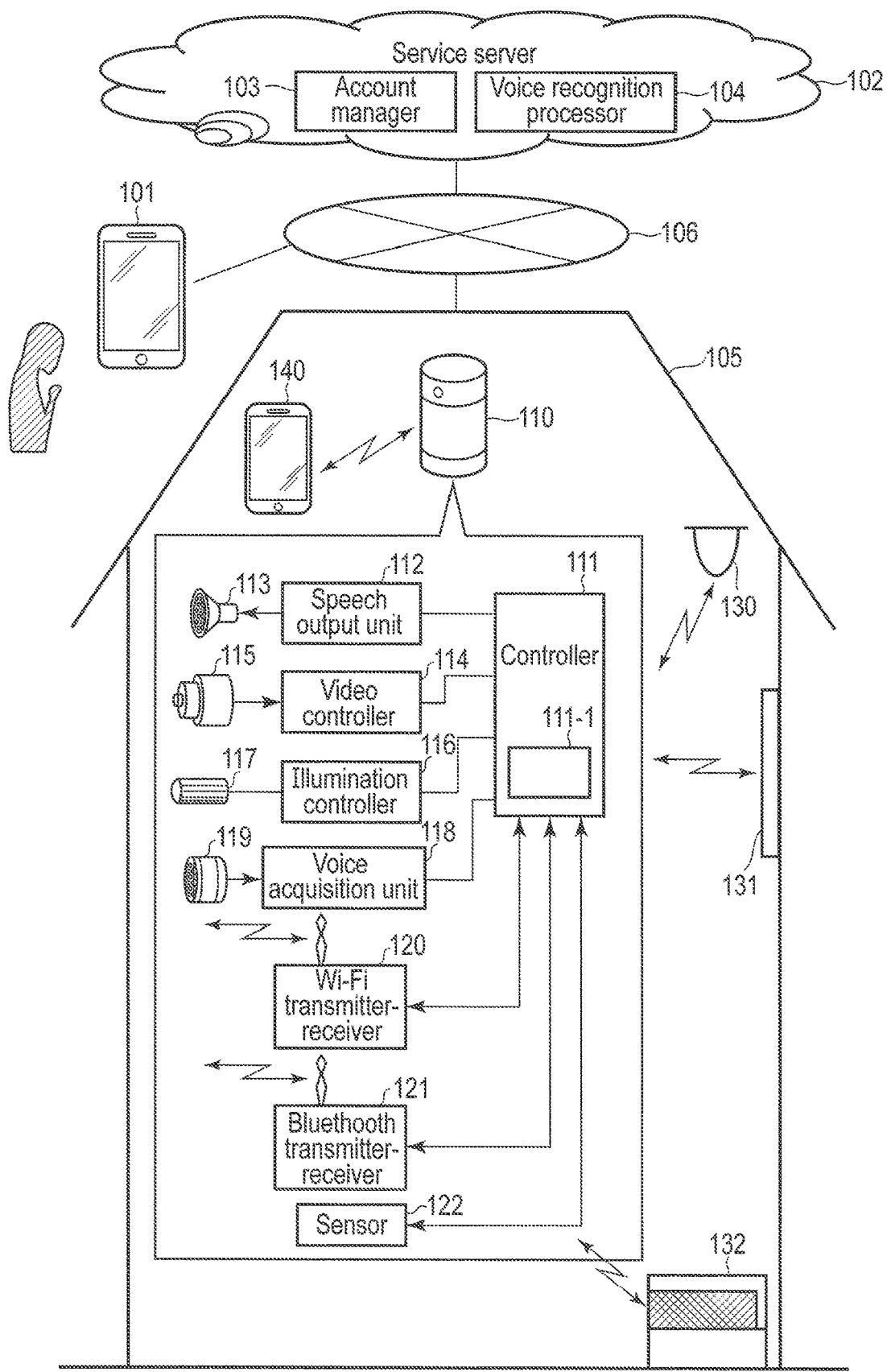
F I G. 1A

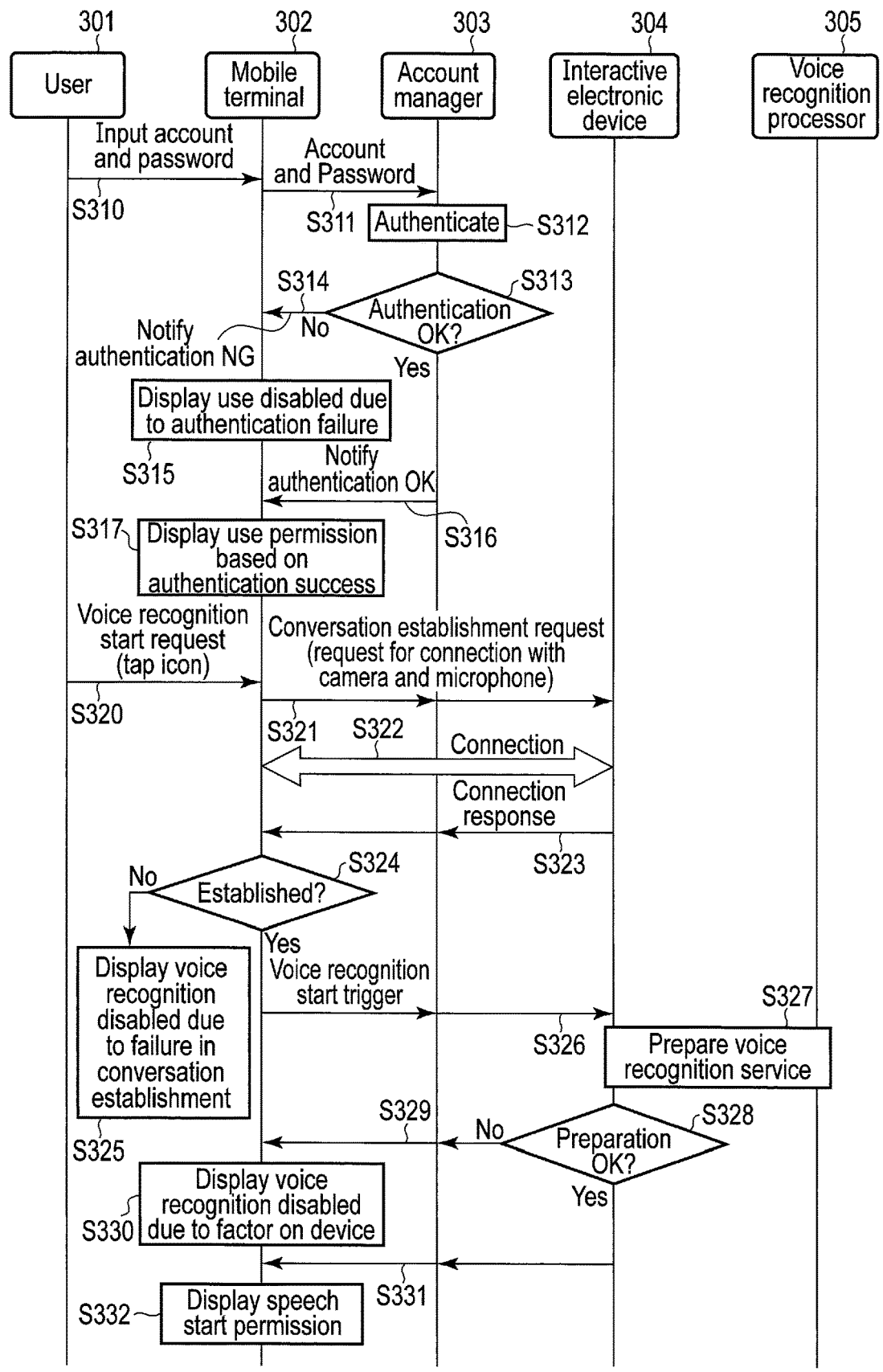
F I G. 3A

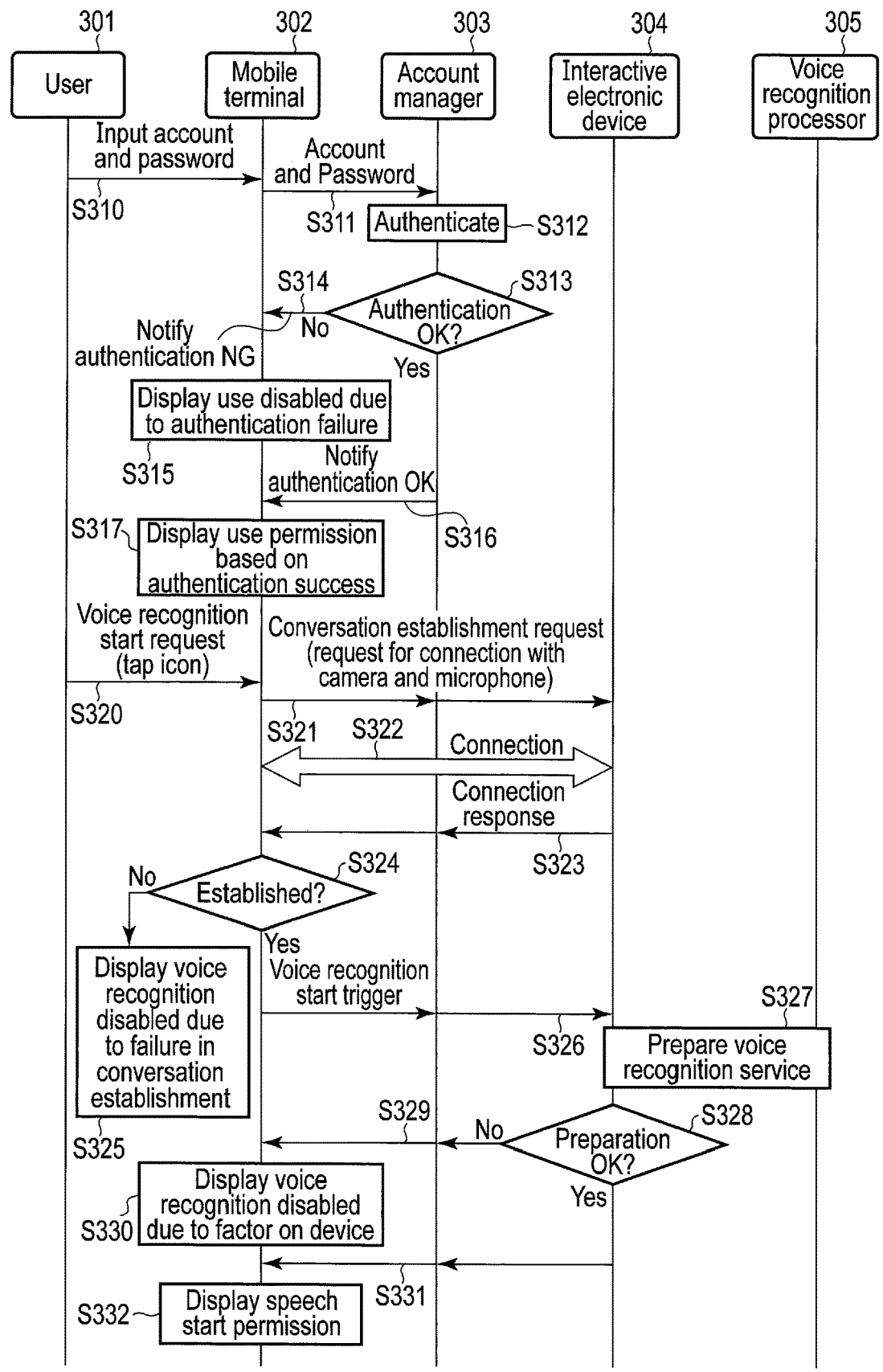
F I G. 3C

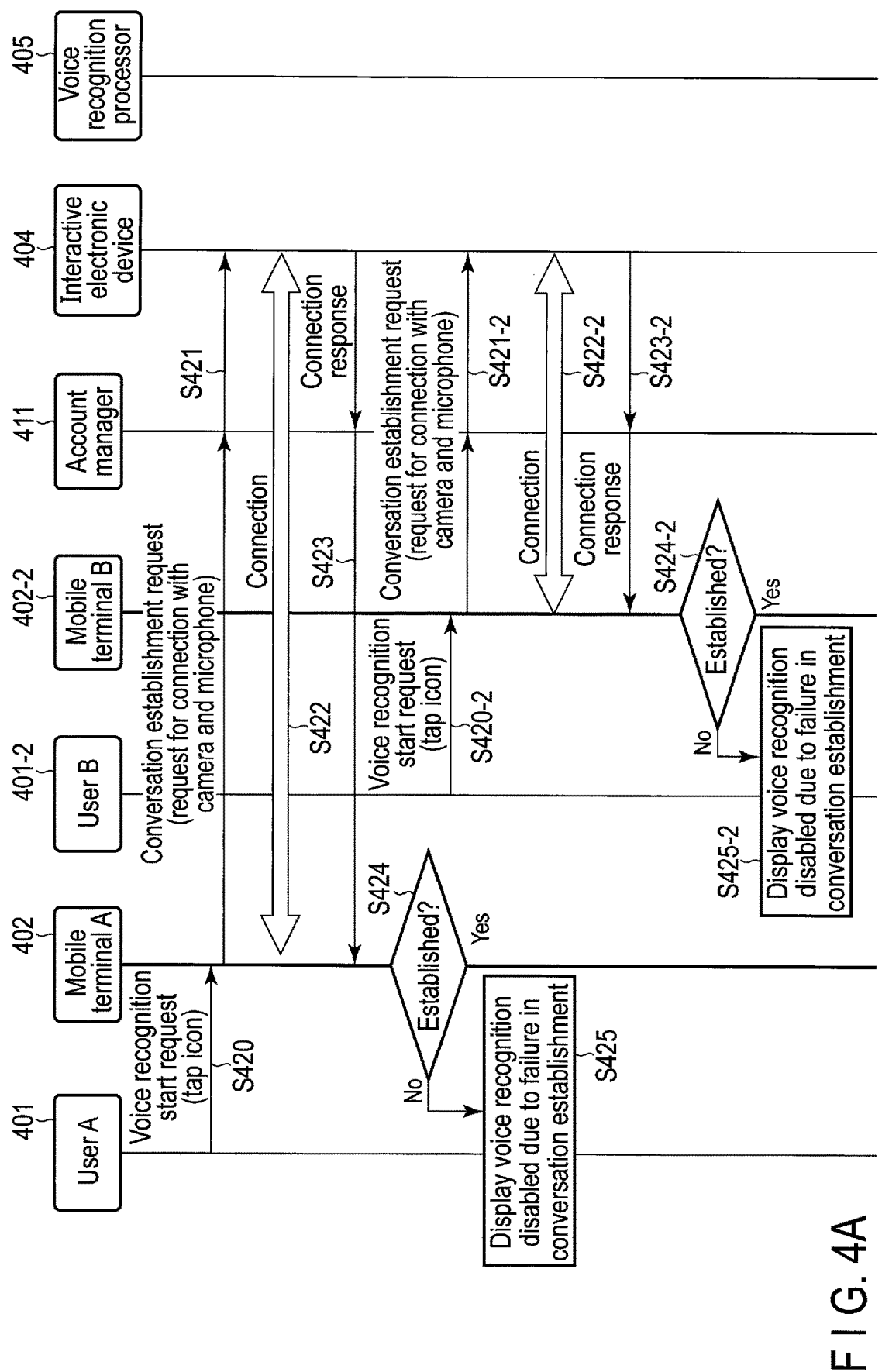
F I G. 4A

| Accounts | Devices |
|---|---|
| a_aaa@xmail.com | TV, Air-conditioner, Open/close entrance, Supply hot water (bath) |
| b_aaa@xmail.com | TV, Air-conditioner |
| c_aaa@xmail.com | Air-conditioner |
| d_aaa@xmail.com | — |

F I G. 5A

| Accounts | Devices |
|---|---|
| a_aaa@xmail.com | TV (Reserve recording): all programs can be reserved (Reserved programs can also be re-reserved (rewritten)) |
| b_aaa@xmail.com | TV (Reserve recording): programs can be reserved but only unreserved programs can be reserved |
| c_aaa@xmail.com | TV (Reserve recording): programs can be reserved but only unreserved programs can be reserved |
| d_aaa@xmail.com | TV (Reserve recording): — |

F I G. 5B

| Accounts | Output destinations |
|---|---|
| a_aaa@xmail.com | • Mobile terminal |
| b_aaa@xmail.com | • Mobile terminal<br>• As for response made by command, read and output response content by voice |
| c_aaa@xmail.com | • Mobile terminal<br>  Interactive electronic device |
| d_aaa@xmail.com | • Mobile terminal<br>  Interactive electronic device |

F I G. 5C

| Accounts | Authority | Devices |
|---|---|---|
| a_aaa@xmail.com | Admin | TV, Air-conditioner, Open/close entrance, Supply hot water (bath) |
| b_aaa@xmail.com | Navtive1 | TV, Air-conditioner |
| c_aaa@xmail.com | Navtive2 | Air-conditioner |
| d_aaa@xmail.com | Guest | - |

FIG. 6A

| Accounts | Authority | Devices |
|---|---|---|
| a_aaa@xmail.com | Admin | TV (Reserve recording): all programs can be reserved (Reserved programs can also be re-reserved (rewritten)) |
| b_aaa@xmail.com | Navtive1 | TV (Reserve recording): programs can be reserved but only unreserved programs can be reserved |
| c_aaa@xmail.com | Navtive2 | TV (Reserve recording): programs can be reserved but only unreserved programs can be reserved |
| d_aaa@xmail.com | Guest | TV (Reserve recording): − |

FIG. 6B

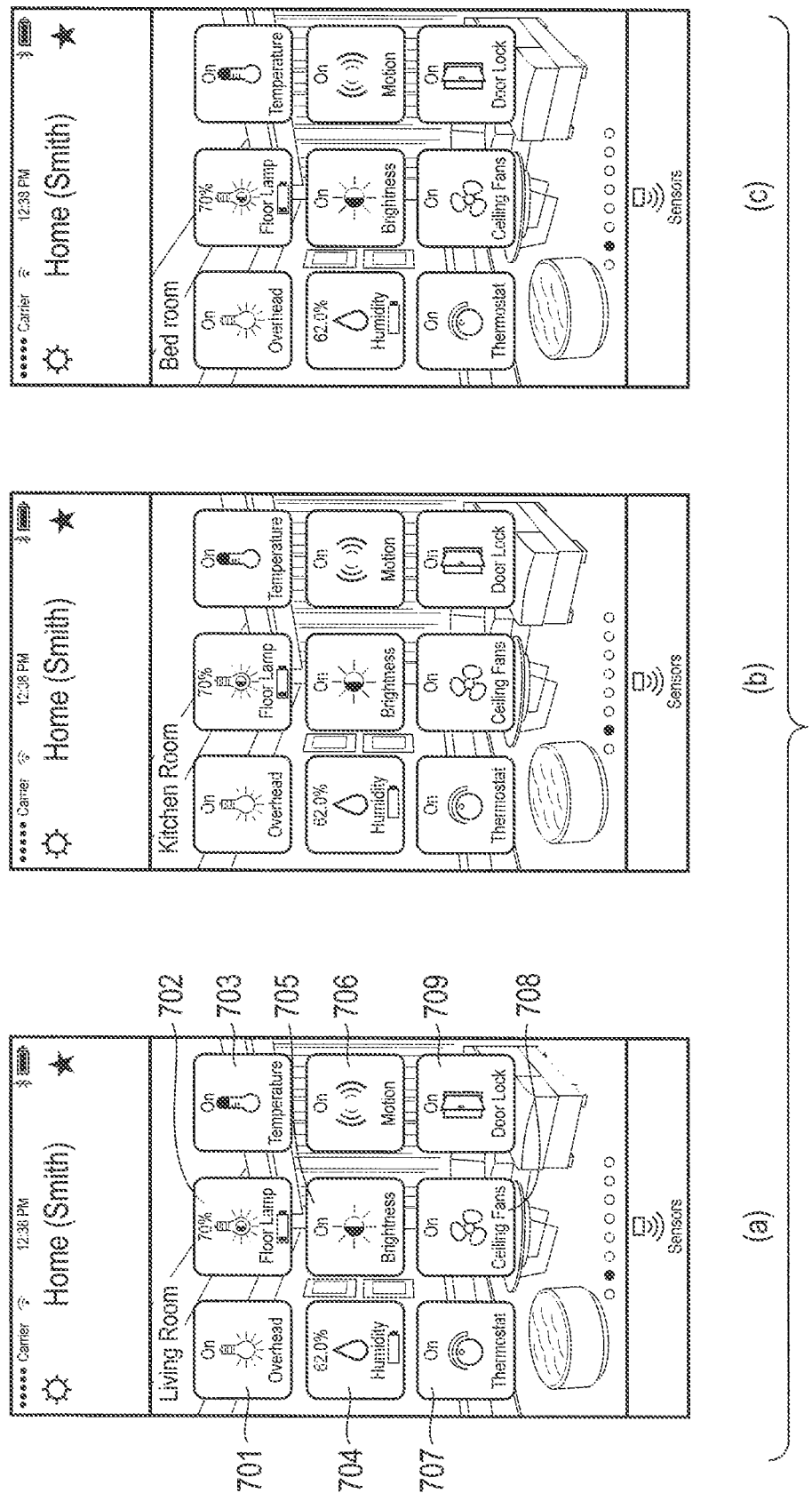
F I G. 7A

INTERACTIVE ELECTRONIC DEVICE CONTROL SYSTEM, INTERACTIVE ELECTRONIC DEVICE, AND INTERACTIVE ELECTRONIC DEVICE CONTROLLING METHOD

CROSS-REFERENCE TO RELATED APPLICATIONS

This application is based upon and claims the benefit of priority from Japanese Patent Application No. 2017-193057, filed Oct. 2, 2017, the entire contents of which are incorporated herein by reference.

FIELD

Embodiments described herein relate generally to an interactive electronic device control system, an interactive electronic device, and an interactive electronic device controlling method.

BACKGROUND

An interactive electronic device collecting speech uttered by a user by, for example, a microphone, analyzing the collected speech by voice recognition, and discriminating the received contents has been developed. This device can control an audio reproducing device such that, for example, the user can provide desired music and control a video reproducing device such that, for example, the user can provide desired video contents, based on the discriminated contents.

The user directly faces the interactive electronic device and executes interaction with the device, and the device can be operated based on the contents of interaction.

For example, interactive electric devices disposed at reception desks of hotels receive visitors, and guide the numbers of the rooms reserved by the visitors, hotel services, and the like by speech.

In addition, as for interactive electronic devices set in home, requests for control (on/off, setting adjustment, and the like) of various home electronic devices (air-conditioners, illumination devices, and the like), control of self-propelled cleaners, and the like have been increased. In future, prevalence of a system using interactive electronic devices can be remarkably expected in the industrial field and the fields of daily society of general people, too.

Thus, the present embodiments aim to provide an interactive electronic device control system, an interactive electronic device, and an interactive electronic device control method, capable of associating a mobile terminal with an interactive electronic device using voice recognition technology and remarkably increasing the range of use and the convenience.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1A is a diagram showing a summary of the interactive electronic device control system according to the present embodiment.

FIG. 3A is a flowchart showing a processing flow in a case where a user of the mobile terminal speaks to a microphone of the mobile terminal and the voice data collected by the microphone is processed by the interactive electronic device control system.

FIG. 3C is a flowchart showing a processing flow in a case where the type of a response generated by the voice recognition processor is a response made by a command in FIG. 3A and FIG. 3B.

FIG. 4A is a flowchart showing a processing flow in a case where users of two mobile terminals connected to the interactive electronic device control system speak to microphones of the respective mobile terminals at arbitrary timing and the voice data collected by the microphones is processed by the interactive electronic device control system.

FIG. 5A is a table showing association of devices controllable in accordance with the voice data input from the mobile terminal with each account.

FIG. 5B is a table showing association of functions which can be controlled by the same device in accordance with the voice data input from the mobile terminal with each account.

FIG. 5C is a table showing association of output destination of response to the voice data input from the mobile terminal with each account.

FIG. 6A is a table showing association of devices controllable in accordance with the voice data input from the mobile terminal with each authority.

FIG. 6B is a table showing association of functions which can be controlled by the same device in accordance with the voice data input from the mobile terminal with each authority.

FIG. 7A shows an example of display of controllable devices displayed on the display screen for each account used by the mobile terminal accessing the interactive electronic device control system.

DETAILED DESCRIPTION

Figure 1B:
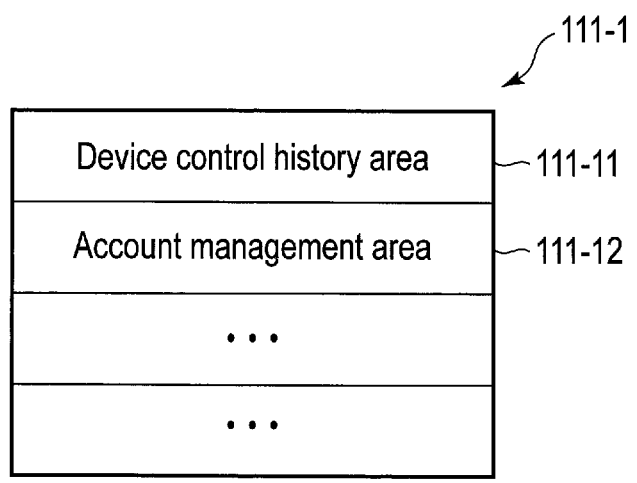
FIG. 1B is a table showing an example of a storage area managed by a controller of the interactive electronic device control system according to the embodiment.

Various embodiments will be described hereinafter with reference to the accompanying drawings.

In general, according to one embodiment, an interactive electronic device control system comprises an interactive electronic device that sends input voice data to a voice recognition service server and receives a response generated based at least in part on a result of recognizing the voice data by the voice recognition service server and an authentication manager that authenticates a mobile terminal connected to the interactive electronic device via a network as an authenticated user, wherein the interactive electronic device sends first voice data received at a microphone of the interactive electronic device to the voice recognition service server to recognize the first voice data, and sends second voice data received from the mobile terminal authenticated as the authenticated user by the authentication manager via the network to the voice recognition service server to recognize the second voice data.

The interactive electronic device is capable of sending first voice data input from outside to the voice recognition service server to recognize the first voice data, and sending second voice data input from the mobile terminal authenticated as the authenticated user by the authentication manager via the network, to the voice recognition service server to recognize the second voice data.

First Embodiment

The interactive electronic device control system according to the First Embodiment is an interactive electronic device control system in which when a user inputs speech to the interactive electronic device control system, not only a speech input unit (for example, a microphone) of an interactive electronic device 110, but a speech input unit (for example, a microphone) of the mobile terminal connected to the interactive electronic device control system can be used.

FIG. 1A is a diagram showing a summary of the interactive electronic device control system according to the present embodiment. The present system is composed of a service server 102 provided in a cloud, the interactive electronic device 110 connected to the service server 102 via a network 106 such as Internet/intranet, a mobile terminalM 140 executing initial settings of the interactive electronic device 110, and a mobile terminal 101 such as a smartphone or a tablet connected via the network 106.

The interactive electronic device 110 is frequently provided in a building 105 but may be provided, for example, outdoors.

The interactive electronic device 110 comprises a controller 111. The controller 111 is connected to a voice output unit 112, a video controller 114, an illumination controller 116, a voice acquisition unit 118, a Wi-Fi transmitter-receiver 120, a Bluetooth (registered trademark) transmitter-receiver 121, and a sensor 122, and can control these units.

The interactive electronic device 110 is an example of an interactive electronic device comprising no display screen. The initial settings of the interactive electronic device 110 are thereby executed with the mobile terminalM 140 connected via a short-range wireless communication system. The mobile terminalM 140 will be explained later.

The controller 111 can output voice data by controlling the voice output unit 112, and the output voice data is D/A-converted by the voice output unit 112, the volume and the like are controlled, and the voice data is supplied to a speaker 113. The voice output unit 112 and the speaker 113 may be external units connected by USB or the like.

In addition, the controller 111 can capture video with a camera 115 by controlling the video controller 114. A video signal of the video captured with the camera 115 is digitized and encoded by the video controller 114 and input to the controller 111.

In addition, the controller 111 can turn on or off an illumination unit 117 by controlling the illumination controller 116. If capturing is executed with the camera 115 and the surrounding is dark, the illumination unit 117 is used to illuminate a capturing area.

In addition, the controller 111 can acquire speech around the microphone 119 by controlling the voice acquisition unit 118. The voice output unit 112 and the speaker 113 may be external units connected by USB or the like.

In addition, the controller 111 can execute Wi-Fi communications with mobile terminals and communication devices in a short range via a Wi-Fi transmitter-receiver 120.

In addition, the controller 111 can execute Bluetooth communications with mobile terminals and communication devices in a short range via a Bluetooth transmitter-receiver 121.

Furthermore, the controller 111 can receive detection signals from various sensors 122 and can control operations (for example, on/off, change of properties, and the like) of various sensors 122. Each of the speaker 113, the camera 115, and the microphone 119 can be controlled to be on and off by user operations.

Furthermore, the controller 111 also comprises a function of permitting the mobile terminal 101 to newly access the mobile terminal 101 in cooperation with an account manager 103 in the service server 102. A procedure of registering the mobile terminal 101 in the present system by this function of the controller 111 will be explained with reference to FIG. 2A and FIG. 2B.

Furthermore, the controller 111 also comprises a function of storing a control history of a device controlled by a response made by a command as explained later, of responses which a voice recognition processor 104 of the service server 102 transmits to the mobile terminal 101. Moreover, the controller 111 also comprises a function of assigning authority to each of accounts of the mobile terminal 101 capable of accessing the interactive electronic device control system and controlling an operation for each authority. Assignment of authority will be explained with reference to FIG. 6A and FIG. 6B.

In addition, the controller 111 includes storage area 111-1 where information managed by the controller 111 is stored. The storage area 111-1 is divided into smaller areas in accordance with the stored information. The smaller areas are areas where, for example, the control history of the device controlled in response to the command is stored, i.e., device control history area 111-11, and an area where the authority for each account is stored, i.e., account management area 111-12.

FIG. 1B shows an example of storage area 111-1.

The controller 111 can connect to a router via, for example, the short-range wireless communication system such as the Wi-Fi transmitter-receiver 120 or the Bluetooth transmitter-receiver 121 and connect to the network 106. The interactive electronic device 110 can thereby execute data exchange together with the mobile terminal 101, the voice recognition processor 104, and the like.

In addition, the interactive electronic device 110 may be, for example, a personal computer (PC) equipped with a camera, or the like. In addition, the interactive electronic device 110 may be equipped with, for example, a short-range wireless communication system such as ZigBee (registered trademark) or Z-Wave (registered trademark) other than Wi-Fi and Bluetooth as the short-range wireless communication system.

An illumination device 130, an air-conditioner 131, a video recording/reproducing device 132, and other audio devices (not shown) are peripheral electronic devices (peripheral devices) which can be controlled by commands transmitted from the controller 111 and which are installed in the building 105 (or can be set outdoors). These peripheral electronic devices are connected to the interactive electronic device 110 by the short-range wireless communication system such as Wi-Fi, Bluetooth, and the like. In the example illustrated in FIG. 1, the interactive electronic device 110 and the peripheral electronic devices are connected by the short-range wireless communication system but may be connected by wired communication.

The server 102 comprises at least two functions. One of the functions is an account manager 103 and the other is the voice recognition processor 104. In the example illustrated in FIG. 1A, the account manager 103 and the voice recognition processor 104 are included in the same server (service server), but may belong to different servers.

The voice recognition processor 104 is a processor which recognizes the voice data transmitted from the interactive electronic device 110 and generates a response to the voice data.

The interactive electronic device 110 transmits the voice data of the speech uttered by the user, which has been collected by the microphone 119, to the voice recognition processor 104 of the service server 102 via the network 106. The voice recognition processor 104 receiving the voice data transmitted from the interactive electronic device 110 analyzes the received voice data and generates a response corresponding to the analyzed content. When the voice recognition processor 104 generates the response, the voice recognition processor 104 transmits the generated response to the interactive electronic device 110 via the network 106.

The responses generated by the voice recognition processor 104 include at least two types of responses corresponding to the voice data input from the interactive electronic device 110. One of the responses is a response made by voice data, and the other is a response made by a command to control the electronic device provided in interactive electronic device 110, for example, the camera 115 or a command to control the peripheral electronic device (peripheral device) connected the interactive electronic device 110 by the short-range wireless communication system, for example, the air-conditioner 131. The voice recognition processor 104 can generate the responses by arbitrarily combining two types of responses, in accordance with the content uttered to the interactive electronic device 110 by the user.

The content of the response made by the voice data is a response to the content which the user has uttered, such as "Good Morning, how are you today?" to speech, for example, "Good Morning", which the user has made to the interactive electronic device 110, or a response such as "If you leave thirty minutes later you will arrive at Osaka station before eight o'clock at night" to the user's question, for example, "If I go to Osaka by Shinkansen now what time will I arrive?". Alternatively, the response may be mutter "the recital was very enjoyable yesterday", irrespective of the user's speech content.

The interactive electronic device 110 receiving the response from the voice recognition processor 104 can output the content of the response from the speaker 113 as speech, for example, under control of the controller 111 if the received response is the response made by the voice data. The user can thereby listen to the response from the interactive electronic device control system to the own speech.

If the received response is the response made by the voice data, it can be controlled which speaker is used to output the content of the response at each time. Basically, however, the response is output to the speaker managed by the device equipped with the microphone which has collected the user's speech. More specifically, if the user speaks to the interactive electronic device 110, the speaker managed by the interactive electronic device 110 outputs the content of the response. In addition, if the user of the mobile terminal 101 which can access the interactive electronic device control system speaks to the microphone of the mobile terminal 101, the speaker managed by the mobile terminal 101 outputs the content of the response.

The voice recognition processor 104 may generate a substitute for the voice data, for example, data which can be converted into speech, such as text data, as the response to be generated, and make a response. In this case, the interactive electronic device 110 may convert the data which can be converted into speech as received from the voice recognition processor 104, into voice data by the voice output unit 112, under control of the controller 111 and output the voice data from the speaker 113 as the speech.

In addition, the content of the response made by the command is a command of the content "device=air-conditioner 131, operation=ON, mode=heating, settings=temperature at twenty-six degrees and wind at maximum level" to speech, for example, "turn on air-conditioner", which the user has made to the interactive electronic device 110, or a command of the content "device=illumination device 117, operation=ON" to "Turn on small light".

The interactive electronic device 110 receiving the response from the voice recognition processor 104 executes the control of the device to be controlled as included in the command, by the controller 111, if the received response is the response made by the command. For example, if the content of the command is "device-air-conditioner 131, operation=ON, mode-cooling, setting-temperature at twenty-six degrees, and wind at maximum level", the interactive electronic device 110 controls the air-conditioner 131 to be activated with the settings of the temperature at twenty-six degrees and the wind at the maximum level, by the short-range wireless communication system such as the Wi-Fi transmitter-receiver 120 or the Bluetooth transmitter-receiver 121, under control of the controller 111.

The interactive electronic device 110 can store a history of the device control using the command received from the voice recognition processor 104, i.e., store the history in the device control history area 111-11 as a device control history.

The account manager 103 is a manager necessary for the mobile terminal 101 to access the interactive electronic device 110 via the network 106. The account manager 103 executes authentication as for whether the mobile terminal 101 is an authenticated user of the interactive electronic device 110. If the authentication is successful, the account manager 103 establishes a path to exchange data between the mobile terminal 101 and the interactive electronic device 110. The user of the mobile terminal 101 can thereby speak to the microphone of the mobile terminal 101 and urge the voice data collected by the microphone to be processed by the voice recognition processor 104 via the network 106, similarly to speaking to the microphone 119 of the interactive electronic device 110 and urging the voice data collected by the microphone 119 to be processed by the voice recognition processor 104.

To obtain authentication from the account manager 103, the user of the mobile terminal 101 preliminarily activates an application (hereinafter called a access application) to access the interactive electronic device control system, which is installed in the mobile terminal 101, and urges the access application to display a screen for inputting an account and a password to access the interactive electronic device control system. If the user of the mobile terminal 101 inputs the account and the password preliminarily registered in the account manager 103 on the input screen, the input account and the input password are transmitted to the account manager 103 of the service server 102 via the network 106.

The account manager 103 executes authentication as for whether the mobile terminal 101 is an authenticated user of the interactive electronic device 110, by the account and the password transmitted from the mobile terminal 101.

The mobile terminal 101 may add inherent identification information of the mobile terminal 101 to the information which should be transmitted to the account manager 103 for authentication, other than the account and the password. Alternatively, the inherent identification information of the mobile terminal 101 and the password alone may be transmitted to the account manager 103. In addition, the account manager 103 may use three types of information, i.e., the transmitted account, the inherent identification information of the mobile terminal 101, and the password, to execute authentication as to whether the mobile terminal 101 is an authenticated user of the voice recognition processor 104.

Alternatively, the authentication may be executed with two types of information, i.e., the inherent identification information of the mobile terminal 101 and the password alone. The account and the password can be arbitrarily set by the user. In addition, the account may be an account including individual identification information.

As explained above, the interactive electronic device control system can input (1) the voice data of the speech uttered by the user facing the interactive electronic device 110 from the microphone 113 of the interactive electronic device 110. In addition, the interactive electronic device control system can input (2) the voice data of the speech uttered by the user having the mobile terminal 101 which has been authenticated by the account authentication, from the microphone of the mobile terminal 101. The voice data input from the microphone of the mobile terminal 101 is transmitted to the interactive electronic device 110 via the network 106. The transmitted voice data is transmitted from the interactive electronic device 110 to the voice recognition processor 104 of the service server 102 and is subjected to voice recognition by the voice recognition processor 104, and at least two types of responses as explained above are generated based on the recognized content. The generated responses are output from the voice recognition terminal 110 or the mobile terminal 101, as the speech, in accordance with the contents of the responses, or used by the voice recognition terminal 110 to control the devices.

Next, an example of registering the mobile terminal 101 in the interactive electronic device control system to permit the mobile terminal 101 to access the interactive electronic device control system will be explained.

The interactive electronic device 110 shown in FIG. 1 is an example of an interactive electronic device comprising no display screen. The initial settings of the interactive electronic device 110 are thereby executed with the mobile terminalM 140 connected via a short-range wireless communication system. To determine the mobile terminalM 140 executing the initial settings of the interactive electronic device 110, the mobile terminalM 140 needs to be registered in the interactive electronic device 110 at the initial settings of the interactive electronic device 110. The mobile terminalM 140 can be registered as the terminal for executing the initial settings of the interactive electronic device 110 by paring the interactive electronic device 110 with the short-range wireless communication system by, for example, Bluetooth or Wi-Fi Direct. If the interactive electronic device 110 specifies the mobile terminalM 140 by pairing, the interactive electronic device 110 siphons the inherent identification information of the mobile terminalM 140 and transmits the information to the account manager 103 via the network 1-6. The account manager 103 generates a setting key necessary for the mobile terminalM 140 to execute initial settings of the interactive electronic device 110, based on the information including the inherent identification information of the mobile terminalM 140 transmitted from the interactive electronic device 110. The account manager 103 transmits the generated setting key to the interactive electronic device 110 via the network 106. The interactive electronic device 110 receiving the setting key transmits the setting key to the mobile terminalM 140, and the mobile terminalM 140 is thereby registered as the terminal for executing the initial settings of the interactive electronic device 110. After that, the mobile terminalM 140 is recognized by the interactive electronic device 110 as the authenticated mobile terminal which can execute the initial settings of the interactive electronic device 110 by the setting key.

In the following explanations, a procedure of registering the mobile terminal 101 which is to access the interactive electronic device control system is executed under the condition that the interactive electronic device 110 does not comprise a display screen and executes the initial settings with the mobile terminalM 140. If the interactive electronic device 110 comprises a display screen, operations using the display screen of the mobile terminalM 140 as explained later may be executed with the display screen of the interactive electronic device 110. The operations using the display screen may be, for example, touch operations or, for example, operations using movement of a cursor.

Figure 2A:
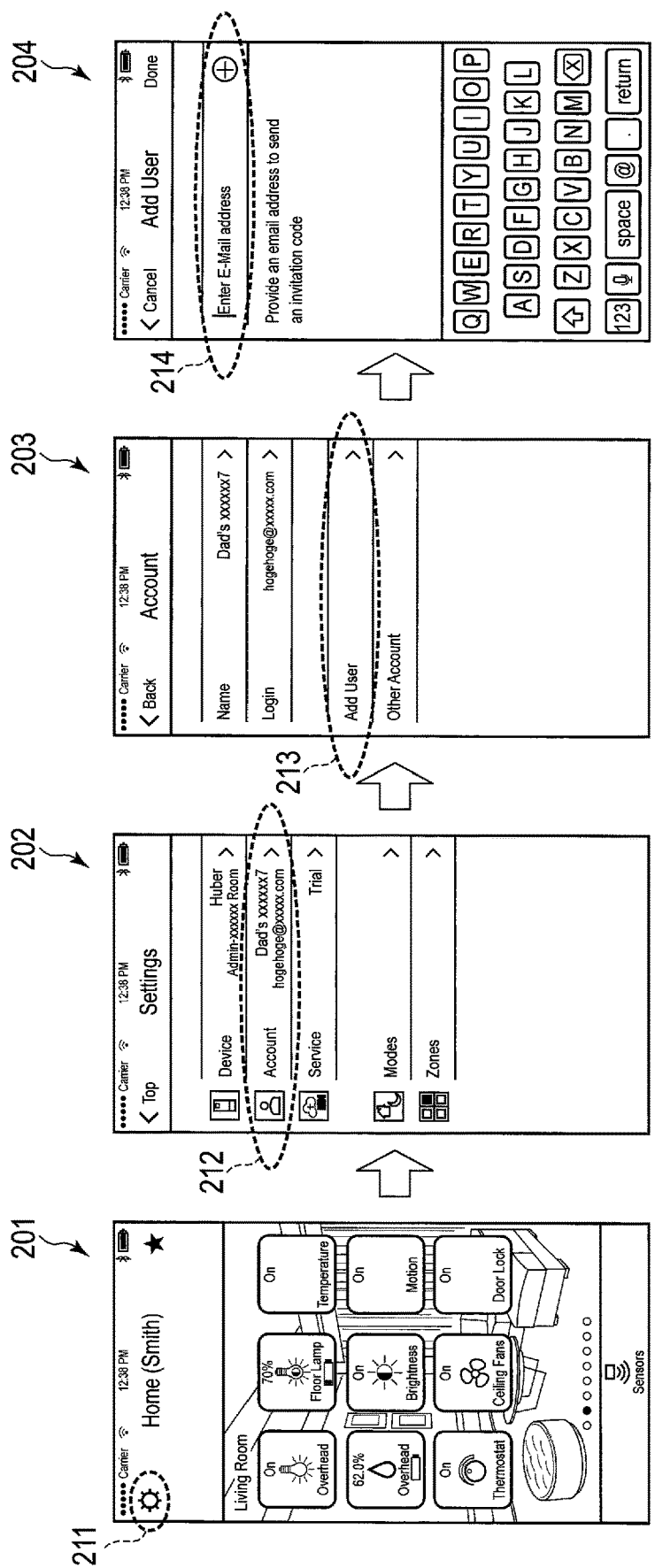
FIG. 2A is an illustration showing an example of screen transition of mobile terminalM executing initial settings of the interactive electronic device in a case of registering the mobile terminal which accesses the interactive electronic device control system according to the embodiment.

FIG. 2A shows a screen transition of the mobile terminalM 140 executing the initial settings of the interactive electronic device 110 in a case of registering the mobile terminal 101 which accesses the interactive electronic device control system according to the embodiment.

A screen 201 is a home screen of the mobile terminalM 140. A mark at the upper left part of the home screen 201 is an icon 211 to jump to function setting (Setting).

If the user taps the icon 211, the display screen of the mobile terminalM 140 transitions to a function setting (Setting) screen 202.

Next, if the user taps an arbitrary account (Account) 212, the display screen of the mobile terminalM 140 transitions to an account (Account) screen 203.

Next, if the user taps an add user (Add User) 213, the display screen of the mobile terminalM 140 transitions to a mail address input screen 204. The user inputs mail address A which the user recognizes to a mail address input field 214 and taps a transmit button (Done) at the upper right part of the screen. An email describing an invitation code (Invitation Code) is thereby transmitted to the mail address A which the user has input to the mail address input field 214. The user of the mobile terminal 101 who wishes to access the interactive electronic device control system continues registration of the mobile terminal 101 which is to access the interactive electronic device control system, by using the invitation code (Invitation Code) sent via email.

Figure 2B:
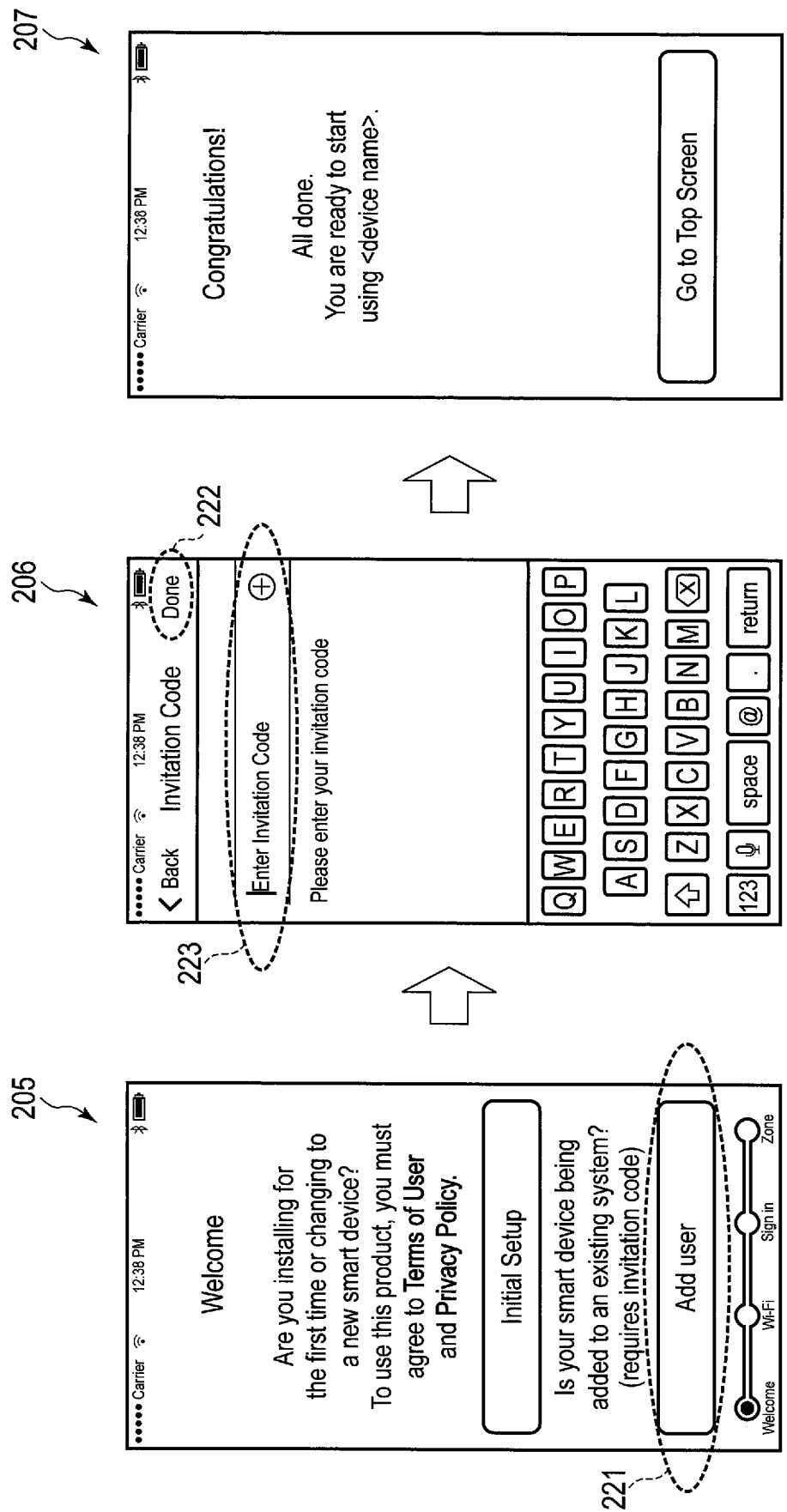
FIG. 2B is an illustration showing screen transition of the mobile terminal executed continuously with the operation shown in FIG. 2A in a case of registering the mobile terminal which accesses the interactive electronic device control system according to the embodiment.

FIG. 2B shows screen transition of the mobile terminal 101 executed continuously with the operation shown in FIG. 2A in a case of registering the mobile terminal 101 which accesses the interactive electronic device control system according to the present embodiment.

Screen 205 is a startup screen of an access application pre-installed in the mobile terminal 101.

If the user taps an add user (Add User) icon 221, the display screen of the mobile terminal 101 transitions to an invitation code (Invitation Code) input screen 206. The user inputs the invitation code (Invitation Code) sent via email from the mobile terminalM 140 explained with reference to FIG. 2A, to an invitation code (Invitation Code) input field 223 and taps a send (Done) button 222. The invitation code is thereby sent to the account manager 103 of the service server 102, and the mobile terminal 101 having the account by which the invitation code has been sent is registered as the authenticated user of the present system. Thus, the mobile terminal 101 which is to access the interactive electronic device control system is invited by the mobile terminalM 140, then accesses the interactive electronic device control system, and is registered as the authenticated user of the present system.

Next, a processing flow in a case where the user of the mobile terminal 101 speaks to the microphone of the mobile terminal 101 and the voice data collected by the microphone is processed by the interactive electronic device control system will be explained.

Figure 3B:
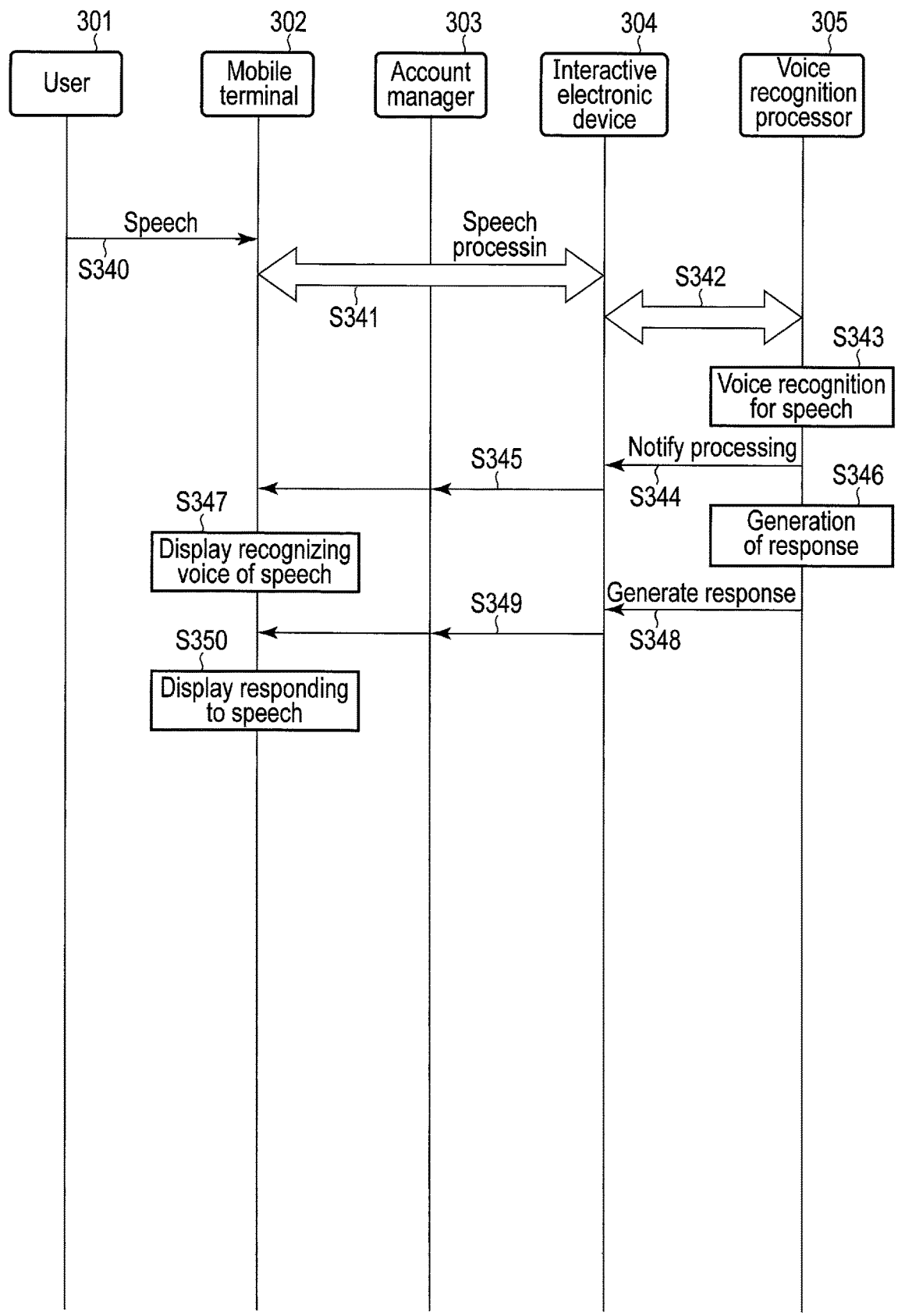
FIG. 3B is a flowchart showing a processing flow in a case where a user of the mobile terminal speaks to a microphone of the mobile terminal and the voice data collected by the microphone is processed by the interactive electronic device control system.

FIG. 3A and FIG. 3B show a processing flow in a case where a user 301 of a mobile terminal 302 speaks to a microphone of the mobile terminal 302 and the voice data collected by the microphone is processed by the interactive electronic device control system.

The user 301 of the mobile terminal 302 inputs an account and a password to an input screen of account and password of the access application displayed on the display screen of the mobile terminal 302, for the purpose of being authenticated as the authenticated user of the interactive electronic device control system (S310). The input account and password are sent from the mobile terminal 302 to an account manager 303 via the network 106 (S311). The account manager 303 receiving the account and the password executes authentication using the received account and password (S312).

In a case of authentication NG (No in S313), as a result of the authentication, the result is sent to the mobile terminal 302 via the network 106 (S314). For example, the mobile terminal 302 receiving the result of authentication NG displays authentication NG on the display screen or urges red LED to flash to make the user 301 understand the authentication result NG (S315).

In a case of authentication OK (Yes in S313), as a result of the authentication, the result is sent to the mobile terminal 302 via the network 106 (S316). For example, the mobile terminal 302 receiving the result of authentication OK displays authentication OK on the display screen or urges blue LED to illuminate to make the user 301 understand the authentication result OK (S317).

The user 301 recognizing that the authentication result is OK taps an icon (hereinafter called a voice recognition icon) to request start of the voice recognition, to execute the voice recognition of speech using the interactive electronic device control system (S320). The mobile terminal 302 recognizing that the voice recognition icon has been tapped sends a conversation establishment request to pass the voice data to an interactive electronic device 304 through an account manager 303, via the network 106 (S321). After this, the interactive electronic device 304 receiving the conversation establishment request executes connection with the mobile terminal 302 for conversation establishment through the account manager 303, via the Internet 106 (S322). If the connection is ended, the interactive electronic device 304 notifies the mobile terminal 302 of a connection response (S323). If the mobile terminal 302 receives the connection response, the mobile terminal 302 confirms its status.

If it is determined that the connection has failed (No in S324) as a result of confirming the status, for example, the mobile terminal 302 displays failure of the connection on the display screen or urges red LED to flash to make the user 301 understand that the voice recognition cannot be executed due to failure of the conversation establishment (S325).

If it is determined that the connection has succeeded (Yes in S324) as a result of confirming the status, the mobile terminal 302 sends a voice recognition start trigger to the interactive electronic device 304 through the account manager 303 via the network 106 (S326). The voice recognition start trigger is a notification to urge the interactive electronic device 304 and the voice recognition processor 305 to prepare, to recognize the content which the user 301 has spoken after communication between the mobile terminal 302 and the interactive electronic device 304 has been established. This notification corresponds to trigger voice (S326-4) shown in FIG. 3G.

The interactive electronic device 304 receiving the voice recognition start trigger makes preparations for the voice recognition service to execute voice recognition of the voice data input from the mobile terminal 302 between the interactive electronic device 304 and the voice recognition processor 305 (S327). If the interactive electronic device 304 ends preparations for the voice recognition service, the interactive electronic device 304 confirms a status at the end of the preparations (S328).

If it is determined that the interactive electronic device 304 has failed the preparations (No in S328) as a result of confirming the status, the interactive electronic device 304 notifies the mobile terminal 302 that the preparations for the voice recognition service have failed (S329). For example, the mobile terminal 302 receiving the notification that the preparations for voice recognition service have failed displays failure of the connection on the display screen or urges red LED to flash to make the user 301 understand that the voice recognition cannot be executed due to failure of the preparations for voice recognition service (S330).

If it is determined that the preparations have succeeded (Yes in S328) as a result of confirming the status, the interactive electronic device 304 notifies the mobile terminal 302 that the preparations for voice recognition service have succeeded (S331). For example, the mobile terminal 302 receiving the notification that the preparations for voice recognition service have succeeded displays speech permission on the display screen or urges blue LED to illuminate to make the user 301 understand that the preparations for voice recognition service have succeeded and the user is permitted to speak the content which the user wishes to be recognized (S332).

The user 301 of the mobile terminal 302 confirming the speech permission in S332 speaks the content which the user wishes the interactive electronic device control system to recognize, to the microphone of the mobile terminal 302 (S340). The content which the user 301 of the mobile terminal 302 has spoken is collected by the microphone of the mobile terminal 302 and sent to the interactive electronic device 304 as the voice data. After that, speech processing is executed between the mobile terminal 302 and the interactive electronic device 304 (S341).

The interactive electronic device 304 receiving the voice data sent from the mobile terminal 302 executes data exchange with the voice recognition processor 305 (S342), and executes the voice recognition of the content which the user 301 of the mobile terminal 302 has spoken (S343). In the process of executing the voice recognition (S343), the voice recognition processor 305 sends a notification of processing indicating that the voice data is currently subjected to the voice recognition to the interactive electronic device 304 (S344). The interactive electronic device 304 receiving the notification of processing sends the content of the received notification of processing to the mobile terminal 302 (S345). For example, the mobile terminal 302 receiving the notification of processing displays a message that the voice recognition is currently executed on the display screen or urges green LED to flash to make the user 301 understand that the voice recognition of the speech (S340) is currently executed (S347).

When the voice recognition processor 305 completes the voice recognition (S343), the voice recognition processor 305 generates a response, based on the recognized content (S346). The response in the example shown in FIG. 3B is a response made by the voice data, of two types of responses explained above. When the voice recognition processor 305 completes generation of the response, the voice recognition processor 305 sends the response to the interactive electronic device 304 (S348). The interactive electronic device 304 receiving the response sends the content of the received response to the mobile terminal 302 (S349). The mobile terminal 302 receiving response outputs the content of the response as the voice through the speaker. The user 301 of the mobile terminal 302 can thereby listen to the response to the speech (S340). In addition, for example, the mobile terminal 302 displays a message that the voice recognition is currently executed on the display screen or urges green LED to flash to make the user 301 understand that the content of the response is being output as the voice (S350).

For example, the mobile terminal 302 can display video indicating each status on the display screen or control LED in characteristic color and patterns to make the user 301 understand the content of the response in each of steps S315, S317, S325, S330, and S332. Since the user 301 can thereby understand that the processing in each step has succeeded or failed at each time, the user does not feel anxious about the processing.

As explained above, the response generated by the voice recognition processor 104 may be a response made by a command.

Figure 3D:
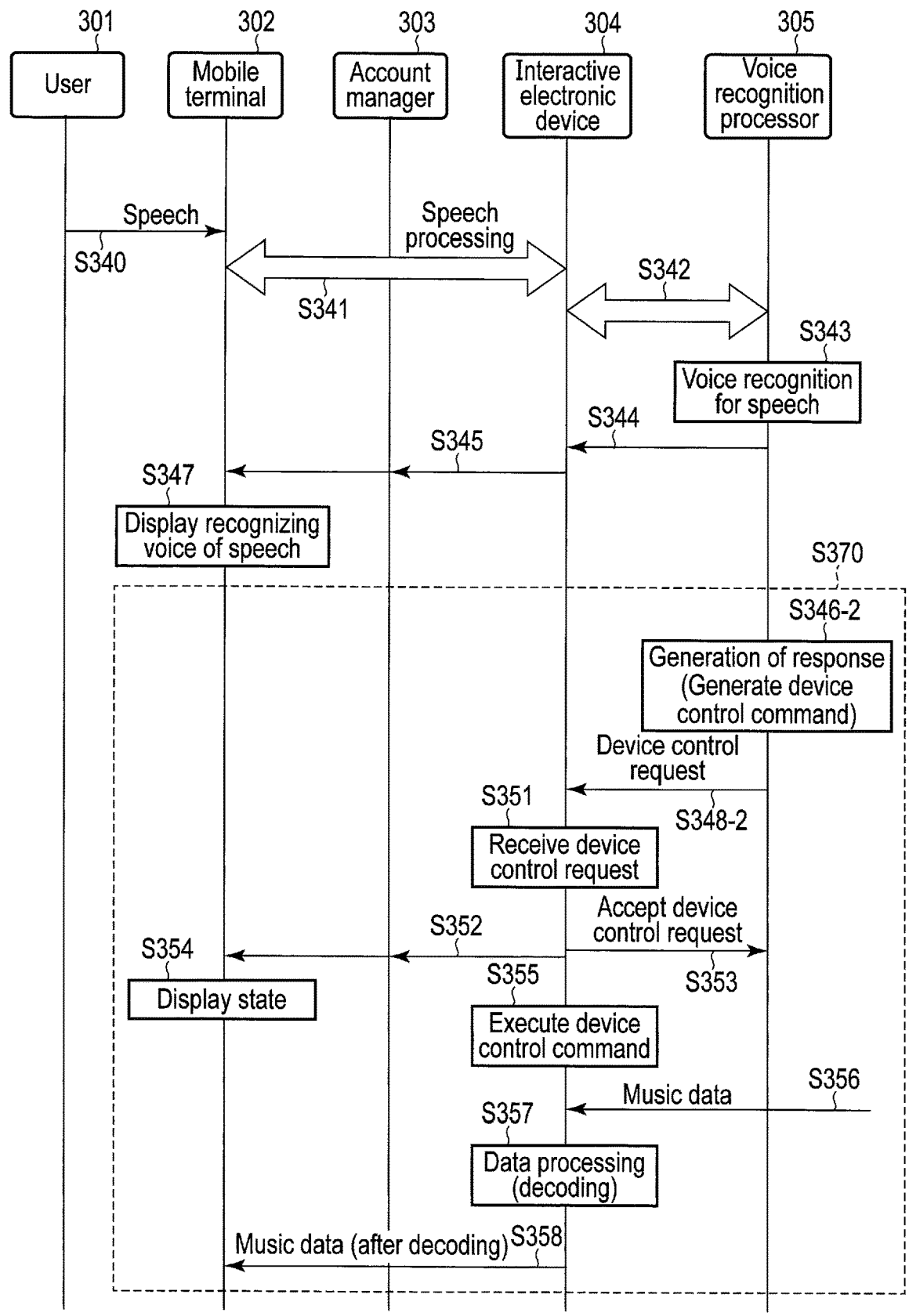
FIG. 3D is a flowchart showing a processing flow in a case where the type of a response generated by the voice recognition processor is a response made by a command in FIG. 3A and FIG. 3B.

FIG. 3C and FIG. 3D show a processing flow in a case where the type of the response generated by the voice recognition processor 305 is a response made by a command, in comparison with FIG. 3A and FIG. 3B. The processing following S347, of the processing shown in FIG. 3C and FIG. 3D is the same as the processing of the same numbers in FIG. 3A and FIG. 3B. A series of processing after S346-2 as surrounded by S370 is a flow of the processing of generating the response by the command, and controlling the device based on the response made by the command, unlike the processing shown in FIG. 3A and FIG. 3B.

It is assumed that, for example, the user 301 of the mobile terminal 302 speaks "Play Music" in speech 340 shown in FIG. 3D. In this case, if the voice recognition processor 305 recognizes "Play Music" in voice recognition 343 for speech 340 shown in FIG. 3D, the voice recognition processor 305 generates a command to request the video recording/reproducing device 132 (see FIG. 1A), which is a peripheral electronic device of the interactive electronic device 304, to send music data (S346-2). When the voice recognition processor 305 completes generation of the command, the voice recognition processor 305 sends the generated command to the interactive electronic device 304 as a device control request (S348-2). The interactive electronic device 304 receiving the device control request (S351) sends a device control request acceptance, i.e., the notification that the device has accepted the device control request, to the voice recognition processor 305 (S353), and sends a command to request sending music data to the video recording/reproducing device 132 which is the peripheral device in accordance with the content of the received device control request (S355). Simultaneously, the interactive electronic device 304 notifies the mobile terminal 302 that the device is controlling the video recording/reproducing device 132 (S352). For example, the mobile terminal 302 receiving the notification displays a situation of control of the video recording/reproducing device 132 on the display screen of the mobile terminal 302 or urges green LED to illuminate to make the user 301 understand that the video recording/reproducing device 132 is controlled correctly (S354).

In the example of the sequence shown in FIG. 3C, the device to be controlled is the video recording/reproducing device 132. In this example, the video recording/reproducing device 132 sends the corresponding music data to the interactive electronic device 304 in response to the command to request sending the music data sent in S355 (S356). The interactive electronic device 304 receiving the corresponding music data decodes the received music data (S357), and sends a result of decoding to the mobile terminal 302 via the network 106 (S358). The mobile terminal 302 receiving the decoded music data outputs the music data received from the speaker. The user 301 of the mobile terminal 302 can thereby listen to the music in response to the speech (S340).

For example, the mobile terminal 302 can display video indicating each status on the display screen or control LED in characteristic color and patterns to make the user 301 understand the content of the response in each of steps S315, S317, S325, S330, and S332. Since the user 301 can thereby understand that the processing in each step has succeeded or failed at each time, the user does not feel anxious about the processing.

In the example shown in FIG. 3A to FIG. 3D, the mobile terminal 302 and the interactive electronic device 304 exchange data through the server 102 via the network 106. However, the mobile terminal 302 and the interactive electronic device 304 may be connected directly with each other by, for example, the short-range wireless communication system such as Bluetooth or Wi-Fi Direct. In this case, the account manager 303 may exist in the interactive electronic device 304.

Figure 3E:
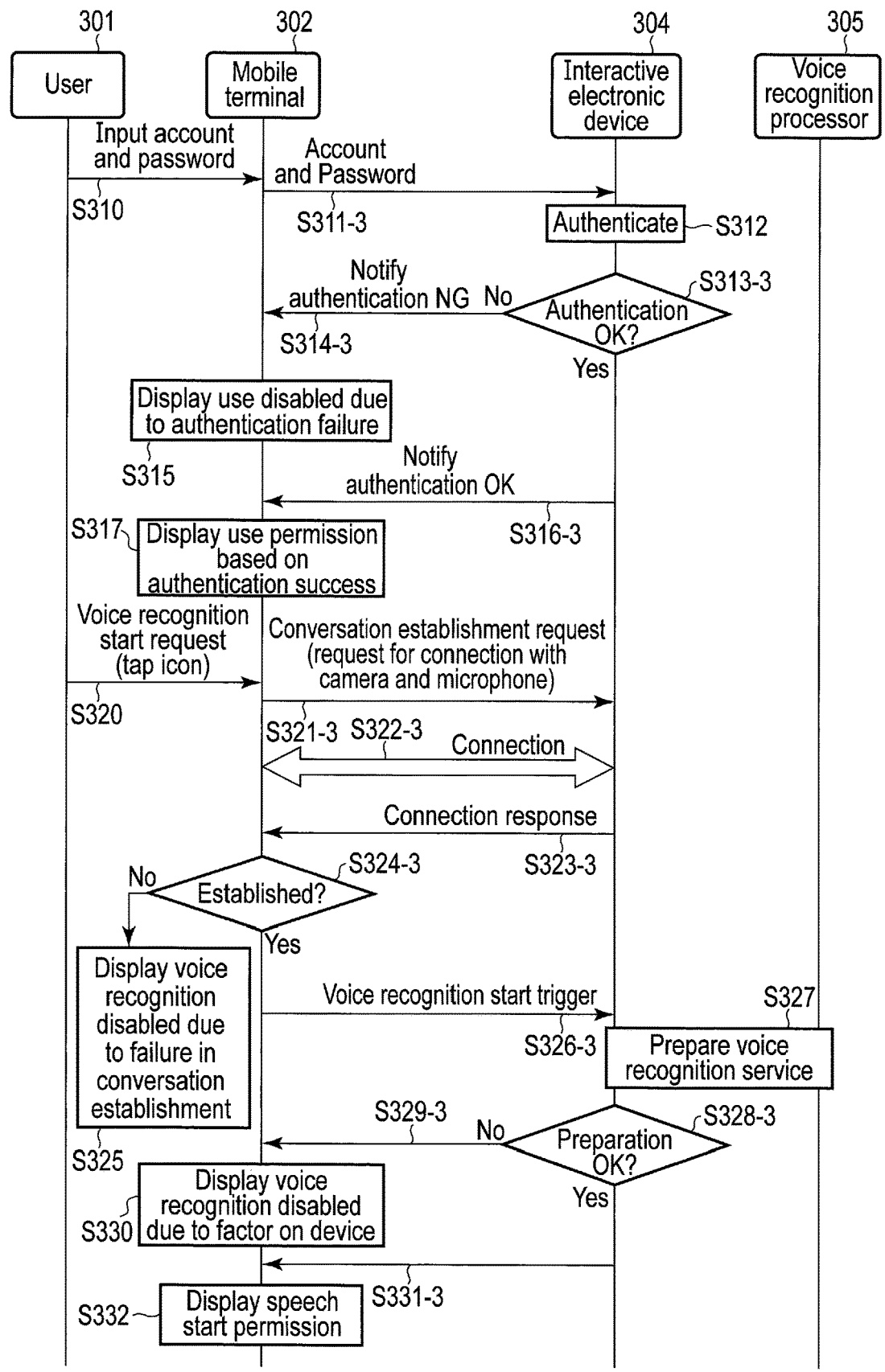
FIG. 3E is a flowchart showing a processing flow in a case where when the mobile terminal and the interactive electronic device are directly connected by a short-range wireless communication system, a user of the mobile terminal speaks to a microphone of the mobile terminal and the voice data collected by the microphone is processed by the interactive electronic device control system.
Figure 3F:
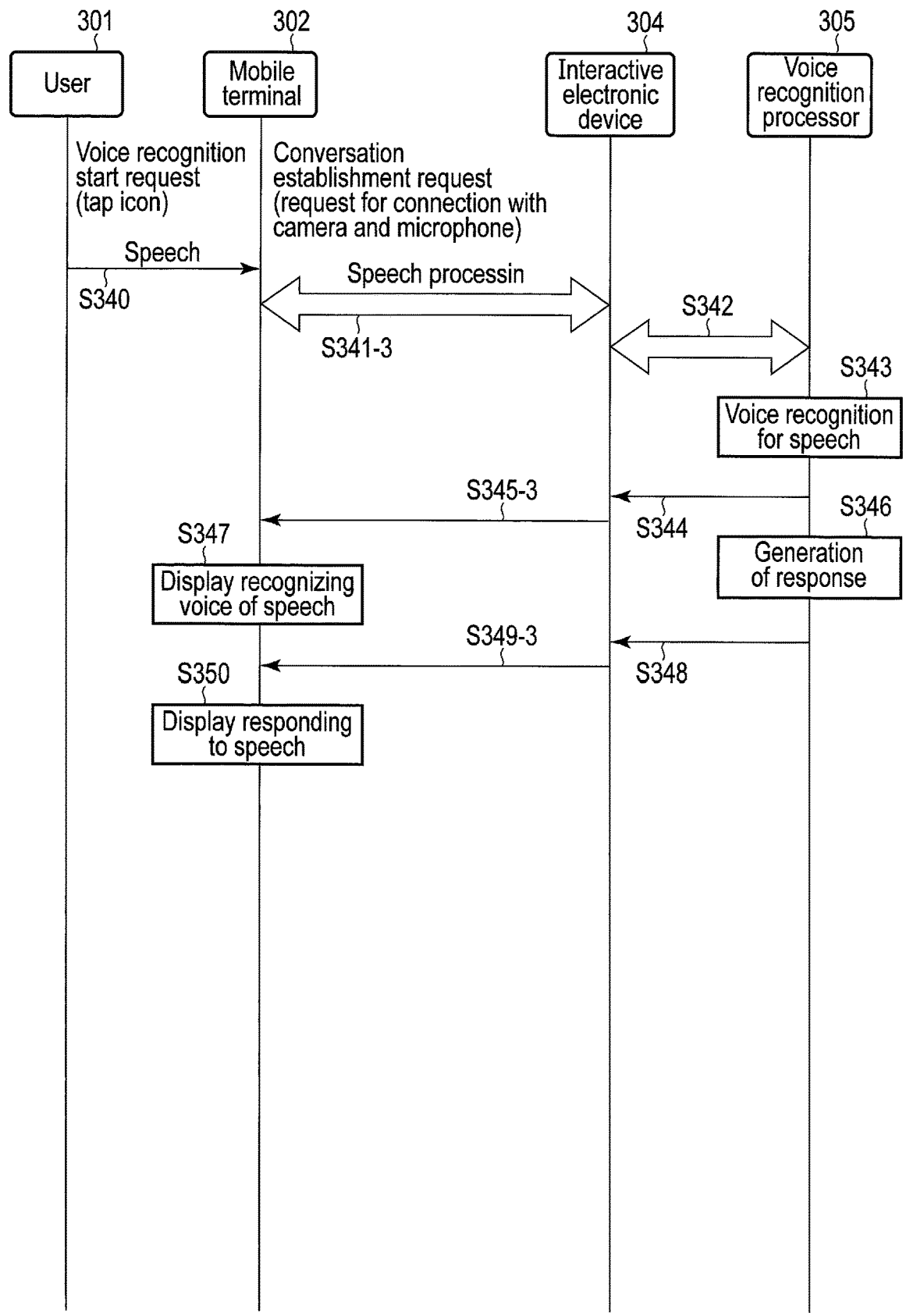
FIG. 3F is a flowchart showing a processing flow in a case where when the mobile terminal and the interactive electronic device are directly connected by a short-range wireless communication system, a user of the mobile terminal speaks to a microphone of the mobile terminal and the voice data collected by the microphone is processed by the interactive electronic device control system.

FIG. 3E and FIG. 3F show a processing flow in a case where when the mobile terminal 302 and the interactive electronic device 304 are directly connected by the short-range wireless communication system, the user of the mobile terminal 302 speaks to the microphone of the mobile terminal 302 and the voice data collected by the microphone is processed by the present system.

In the case of FIG. 3E, the interactive electronic device 304 comprises the function corresponding to the account manager. Therefore, the processing from S310 to S317 shown in FIG. 3E is different from the processing shown in FIG. 3A with respect to a feature of executing authentication between the mobile terminal 302 and the interactive electronic device 304 (including the account management function). After the authentication succeeds and the user 301 taps the voice recognition icon (S320), the data exchange between the mobile terminal 302 and the interactive electronic device 304 is executed not through account manager 303, and is basically the same as the processing shown in FIG. 3A and FIG. 3B. The processing flow shown in FIG. 3E and FIG. 3F will be hereinafter explained in detail.

The user 301 of the mobile terminal 302 shown in FIG. 3E inputs the account and the password to the input screen of account and password of the access application displayed on the display screen of the mobile terminal 302, for the purpose of being authenticated as the authenticated user of the interactive electronic device control system (S310). The input account and password are sent from the mobile terminal 302 to an account management function of the interactive electronic device 304 via the short-range wireless communication system (S311-3). The account management function of the interactive electronic device 304 receiving the account and the password executes authentication using the received account and password (S312).

In a case of authentication NG (No in S313-3), as a result of the authentication, the result is sent to the mobile terminal 302 via the short-range wireless communication system (S314-3). For example, the mobile terminal 302 receiving the result of authentication NG displays authentication NG on the display screen or urges red LED to flash to make the user 301 understand the authentication result NG (S315).

In a case of authentication OK (Yes in S313-3), as a result of the authentication, the result is sent to the mobile terminal 302 (S316-3). For example, the mobile terminal 302 receiving the result of authentication OK displays authentication OK on the display screen or urges blue LED to illuminate to make the user 301 understand the authentication result OK (S317).

The user 301 recognizing that the authentication result is OK taps the voice recognition icon to execute the voice recognition of speech using the interactive electronic device control system (S320). The mobile terminal 302 recognizing that the voice recognition icon has been tapped sends a conversation establishment request to pass the voice data to the interactive electronic device 304 through the interactive electronic device control system (S321-3). The interactive electronic device 304 receiving the conversation establishment request executes connection with the mobile terminal 302 for conversation establishment through the interactive electronic device control system (S322-3). If the connection is ended, the interactive electronic device 304 notifies the mobile terminal 302 of a connection response (S323-3). If the mobile terminal 302 receives the connection response, the mobile terminal 302 confirms its status.

If it is determined that the connection has failed (No in S324-3) as a result of confirming the status, for example, the mobile terminal 302 displays failure of the connection on the display screen or urges red LED to flash to make the user 301 understand that the voice recognition cannot be executed due to failure of the conversation establishment (S325).

If it is determined that the connection has succeeded (Yes in S324-3) as a result of confirming the status, the mobile terminal 302 sends the voice recognition start trigger to the interactive electronic device 304 through the interactive electronic device control system (S326-3).

The interactive electronic device 304 receiving the voice recognition start trigger makes preparations for the voice recognition service to execute voice recognition of the voice data input from the mobile terminal 302 between the interactive electronic device 304 and the voice recognition processor 305 (S327). If the interactive electronic device 304 ends preparations for the voice recognition service, the interactive electronic device 304 confirms a status at the end of the preparations (S328-3).

If it is determined that the interactive electronic device 304 has failed the preparations (No in S328-3) as a result of confirming the status, the interactive electronic device 304 notifies the mobile terminal 302 that the preparations for the voice recognition service have failed (S329-3). For example, the mobile terminal 302 receiving the notification that the preparations for voice recognition service have failed displays failure of the connection on the display screen or urges red LED to flash to make the user 301 understand that the voice recognition cannot be executed due to failure of the preparations for voice recognition service (S330).

If it is determined that the preparations have succeeded (Yes in S328-3) as a result of confirming the status, the interactive electronic device 304 notifies the mobile terminal 302 that the preparations for voice recognition service have succeeded (S331-3). For example, the mobile terminal 302 receiving the notification that the preparations for voice recognition service have succeeded displays speech permission on the display screen or urges blue LED to illuminate to make the user 301 understand that the preparations for voice recognition service have succeeded and the user is permitted to speak the content which the user wishes to be recognized (S332).

The user 301 of the mobile terminal 302 confirming the speech permission in S332 speaks the content which the user wishes the interactive electronic device control system to recognize, to the microphone of the mobile terminal 302 (S340). The content which the user 301 of the mobile terminal 302 has spoken is collected by the microphone of the mobile terminal 302 and sent to the interactive electronic device 304 as the voice data. After that, speech processing is executed between the mobile terminal 302 and the interactive electronic device 304 (S341-3).

The interactive electronic device 304 receiving the voice data sent from the mobile terminal 302 executes data exchange with the voice recognition processor 305 (S342), and executes the voice recognition of the content which the user 301 of the mobile terminal 302 has spoken (S343). In the process of executing the voice recognition (S343), the voice recognition processor 305 sends a notification of processing indicating that the voice data is currently subjected to the voice recognition to the interactive electronic device 304 (S344). The interactive electronic device 304 receiving the notification of processing sends the content of the received notification of processing to the mobile terminal 302 (S345-3). For example, the mobile terminal 302 receiving the notification of processing displays a message that the voice recognition is currently executed on the display screen or urges green LED to flash to make the user 301 understand that the voice recognition of the speech (S340) is currently executed (S347).

When the voice recognition processor 305 completes the voice recognition (S343), the voice recognition processor 305 generates a response, based on the recognized content (S346). The response in the example shown in FIG. 3F is a response made by the voice data, of two types of the responses explained above. When the voice recognition processor 305 completes generation of the response, the voice recognition processor 305 sends the response to the interactive electronic device 304 (S348). The interactive electronic device 304 receiving the response sends the content of the received response to the mobile terminal 302 (S349-3). The mobile terminal 302 receiving response outputs the content of the response as the voice through the speaker. The user 301 of the mobile terminal 302 can thereby listen to the response to the speech (S340). In addition, for example, the mobile terminal 302 displays a message that the voice recognition is currently executed on the display screen or urges green LED to flash to make the user 301 understand that the content of the response is being output as the voice (S350).

For example, the mobile terminal 302 can display video indicating each status on the display screen or control LED in characteristic color and patterns to make the user 301 understand the content of the response in each of steps S315, S317, S325, S330, and S332. Since the user 301 can thereby understand that the processing in each step has succeeded or failed at each time, the user does not feel anxious about the processing.

Figure 3G:
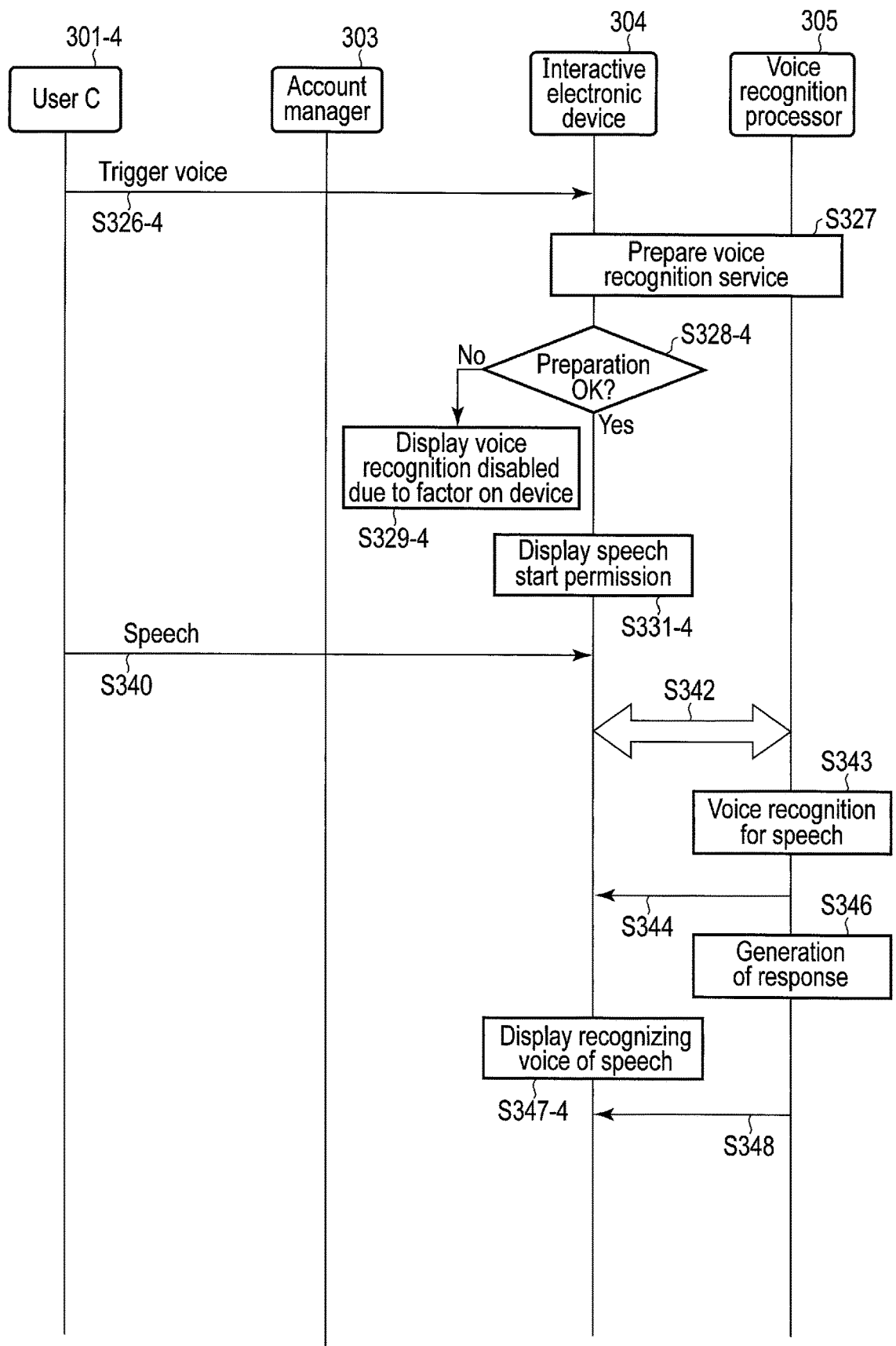
FIG. 3G is a flowchart showing a processing flow in a case where a user directly speaks to the interactive electronic device and the voice data collected by the microphone, of the interactive electronic device is processed by the interactive electronic device control system.

FIG. 3G shows a processing flow in a case where a userC 301-4 directly speaks to the interactive electronic device 304 and the voice data collected by the microphone of the interactive electronic device 304 is processed by the interactive electronic device control system.

When the userC 301-4 directly speaks to the interactive electronic device 304 and requests the voice recognition, the userC 301-4 needs to speak a certain keyword called a trigger voice to the interactive electronic device 304 (S326-4). This corresponds to the voice recognition start request (S320) shown in FIG. 3A.

The interactive electronic device 304 receiving the trigger voice makes preparations for the voice recognition service to execute voice recognition of the voice data input from the interactive electronic device 304 between the interactive electronic device 304 and the voice recognition processor 305 (S327). If the interactive electronic device 304 ends preparations for the voice recognition service, the interactive electronic device 304 confirms a status at the end of the preparations (S328-4).

If it is determined that the preparations have failed (No in S328-4) as a result of confirming the status, for example, the interactive electronic device 304 urges red LED to flash to make the userC 301-4 understand that the preparations for voice recognition service have failed and the system cannot execute the voice recognition (S329-4).

If it is determined that the preparations have succeeded (Yes in S328-4) as a result of confirming the status, for example, the interactive electronic device 304 urges blue LED to illuminate to make the userC 301-4 understand that the preparations for voice recognition service have succeeded and the user may speak the content which the user wishes the system to recognize (S331-4).

The userC 301-4 of the interactive electronic device 304 confirming the speech permission in S331-4 speaks the content which the user wishes the interactive electronic device control system to recognize, to the microphone of the interactive electronic device 304 (S340). The content which the userC 301-4 speaks is collected by the microphone of the interactive electronic device 304.

The interactive electronic device 304 collecting the spoken content by the microphone executes voice recognition of the content of the collected speech between the interactive electronic device 304 and the voice recognition processor 305 (S343). In the process of executing the voice recognition (S343), the voice recognition processor 305 sends a notification of processing indicating that the voice data is currently subjected to the voice recognition to the interactive electronic device 304 (S344). For example, the interactive electronic device 304 receiving the notification of processing urges green LED to flash to make the userC 301-4 understand that the voice recognition for the speech is currently executed (S347-4).

When the voice recognition processor 305 completes the voice recognition (S343), the voice recognition processor 305 generates a response, based on the recognized content (S346). The response in the example shown in FIG. 3G is a response made by the voice data, of two types of the responses explained above. When the voice recognition processor 305 completes generation of the response, the voice recognition processor 305 sends the response to the interactive electronic device 304 (S348). The interactive electronic device 304 receiving the response outputs the content of the response as the voice through the speaker. The userC 301-4 of the interactive electronic device 304 can thereby listen to the response to the speech (S340).

The voice recognition of the voice input from the microphone of the mobile terminal 302 shown in FIG. 3A to FIG. 3F and the voice recognition of the voice input from the microphone of the interactive electronic device 304 shown in FIG. 3G are executed independently of each other, in the voice recognition processor 305. Each of the userC 301-4 facing the interactive electronic device 304 and making speech and the user 301 speaking to the microphone of the mobile terminal 302 can therefore speak at arbitrary timing.

Since the userC 301-4 facing the interactive electronic device 304 and making speech, the user 301 speaking to the microphone of the mobile terminal 302, and the like, do not need to worry about the mutual timing of speech, the system has good usability.

For example, the mobile terminal 302 can display video indicating each status on the display screen or control LED in characteristic color and patterns to make the user 301 understand the content of the response in each of steps S315, S317, S325, S330, and S332. Since the user 301 can thereby understand that the processing in each step has succeeded or failed at each time, the user does not feel anxious about the processing.

As explained above, the interactive electronic device control system cannot only obtain the voice data of the speech which the user facing the interactive electronic device 110 speaks from the microphone 113, but can obtain the voice data of the speech which the user carrying the mobile terminal 101 as confirmed as the authenticated user of the interactive electronic device control system, from the microphone of the mobile terminal 101. In addition, since the voice recognition of the voice directly input to the microphone of the interactive electronic device 110 and the voice recognition of the voice input from the microphone of the mobile terminal 101 are executed independently of each other, each of the user facing the interactive electronic device 304 and making speech and the user speaking to the microphone of the mobile terminal 101 can speak at arbitrary timing. In addition, the user speaking to the microphone of the mobile terminal 101 does not need to consider a distance from the interactive electronic device 110. Convenience of the interactive electronic device control system is thereby improved remarkably.

In addition, the user of the mobile terminal 302 can use the voice recognition of the system even if the user exists closely to or remote from the interactive electronic device 304. The user of the mobile terminal 302 near the interactive electronic device 304 may be able to speak directly to the microphone of the interactive electronic device 304. However, if the other user exists closely to the interactive electronic device 304 in an unarranged state, the user of the mobile terminal 302 can also urge the interactive electronic device control system to certainly execute the voice recognition by speaking to the microphone of the mobile terminal and urging the microphone of the mobile terminal to collect the content of the speech.

Second Embodiment

The interactive electronic device control system according to the Second Embodiment is an interactive electronic device control system in which when voice is input to the interactive electronic device control system from a plurality of mobile terminals of a plurality of users using voice input units (for example, microphones) of the respective mobile terminals, the users can input the voice at arbitrary timing.

Figure 4B:
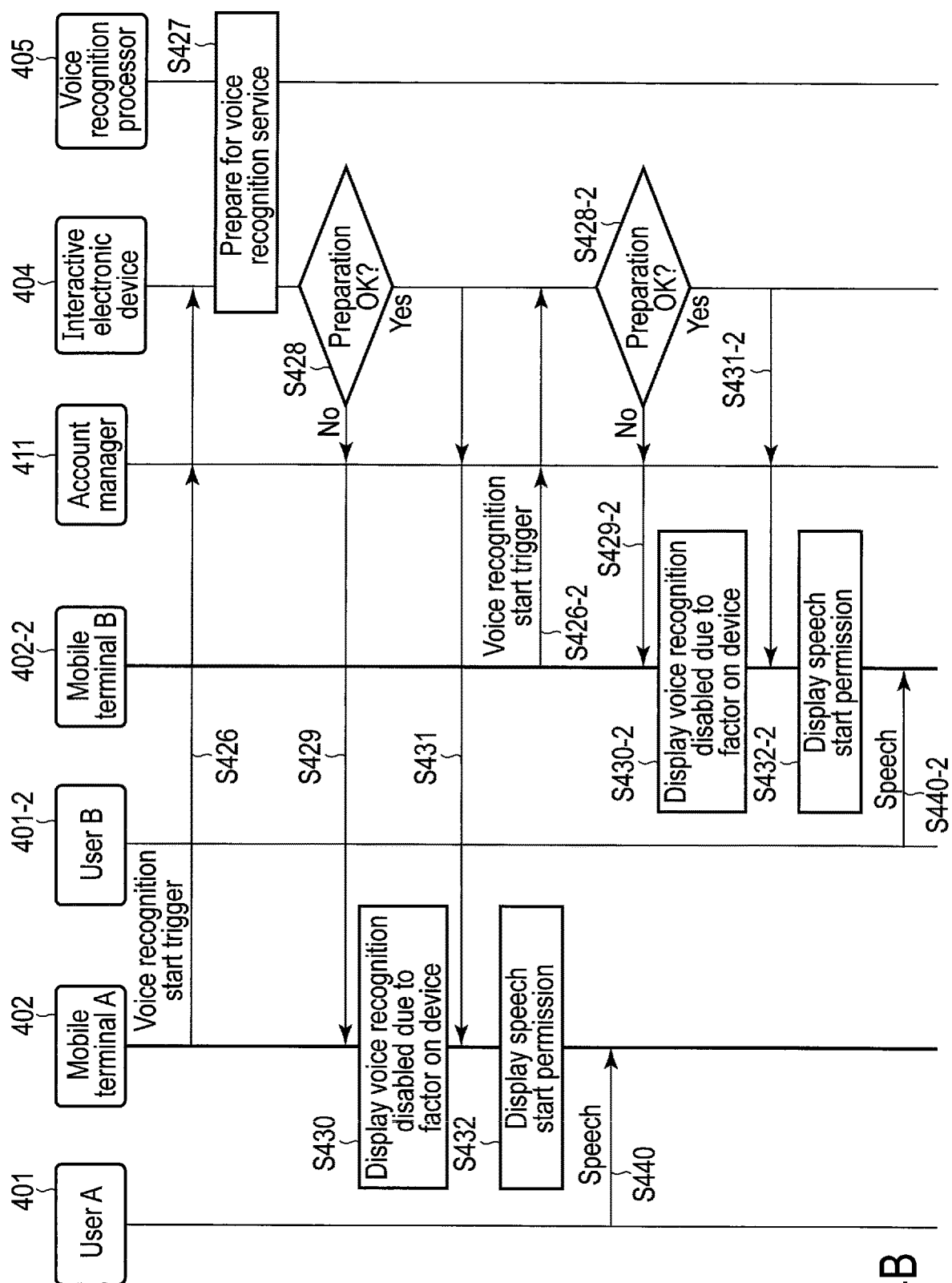
FIG. 4B is a flowchart showing a processing flow in a case where users of two mobile terminals connected to the interactive electronic device control system speak to microphones of the respective mobile terminals at arbitrary timing and the voice data collected by the microphones is processed by the interactive electronic device control system.
Figure 4C:
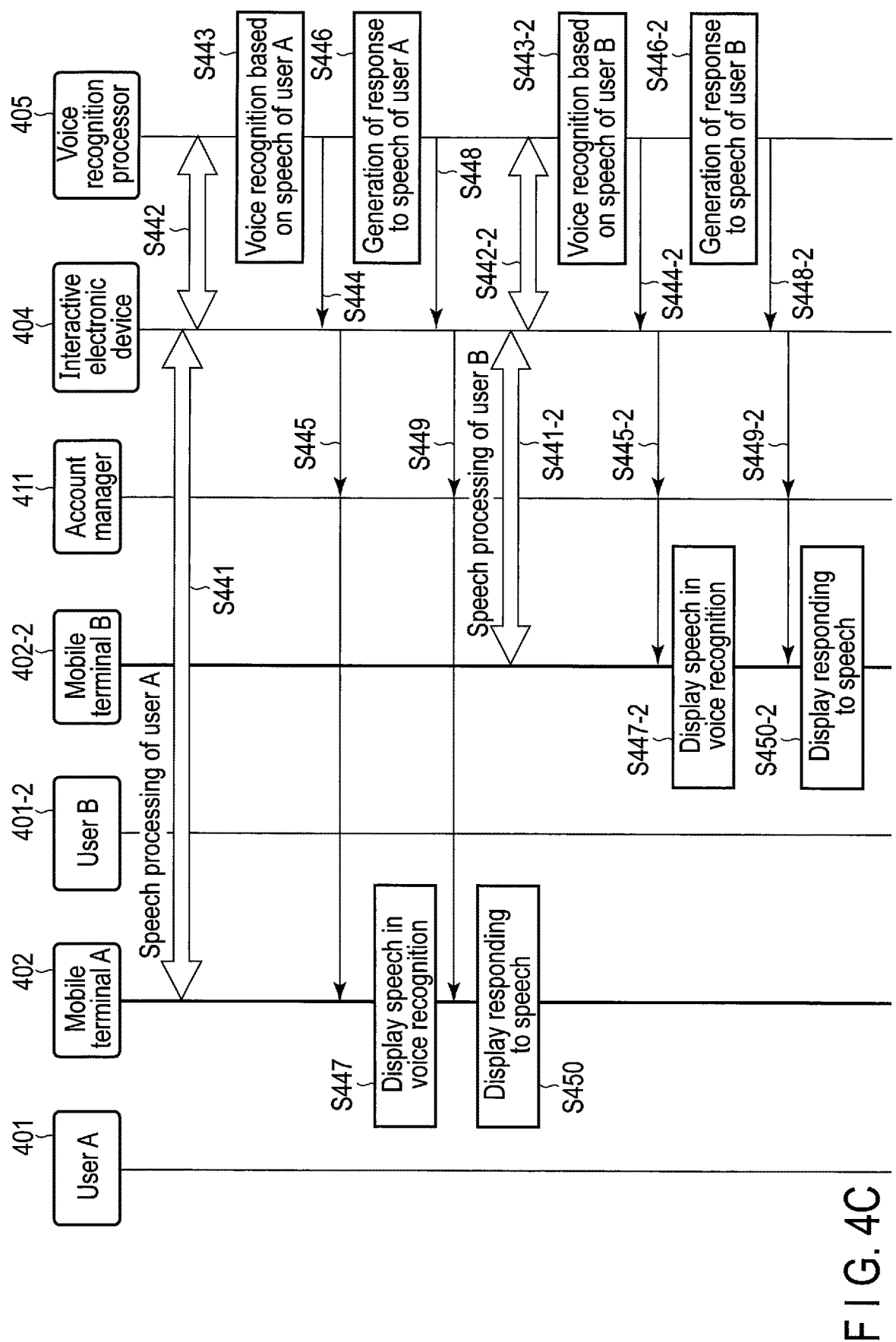
FIG. 4C is a flowchart showing a processing flow in a case where users of two mobile terminals connected to the interactive electronic device control system speak to microphones of the respective mobile terminals at arbitrary timing and the voice data collected by the microphones is processed by the interactive electronic device control system.

FIG. 4A, FIG. 4B, and FIG. 4C show a processing flow in a case where userA 401 and userB 401-2 who are owners of respective mobile terminalA 402 and mobile terminalB 402-2 connected to the interactive electronic device control system speak to microphones of the mobile terminalA 402 and mobile terminalB 402-2 owned by the respective users, at arbitrary timing, and the voice data collected by each of the microphones is processed by the present system. If a plurality of mobile terminals of a plurality of users access the interactive electronic device control system, too, the processing of authenticating the user of the interactive electronic device control system indicated in S310 to S317 shown in FIG. 3A is executed in each of the mobile terminals, but explanations of the processing flow shown in FIG. 4A are omitted.

After the userA 401 who is the owner of the mobile terminalA 402 taps the voice recognition icon which requests start of the voice recognition (S420), the processing relating to the mobile terminalA 402 is that indicated in S420 to S450. This processing is the same as the processing flow in a case where only one mobile terminal is connected to the interactive electronic device control system.

In contrast, after the userB 401-2 of the mobile terminalB 402-2 taps the voice recognition icon which requests start of the voice recognition (S420-2), the processing relating to the mobile terminalB 402-2 is that indicated in S420-2 to S450-2.

In the example of sequence shown in FIG. 4A, FIG. 4B, and FIG. 4C, since the processing in S420 to S450 which is associated with the mobile terminalA 402 and the processing in S420-2 to S450-2 which is associated with the mobile terminalB 402-2 are executed in advance, closely in time, the processing of preparing for the voice recognition service for the speech of the userB 401-2 does not need to be executed again in response to the processing of preparing for the voice recognition service (S427). The processing in S420 to S450 which is associated with the mobile terminalA 402 and the processing in S420-2 to S450-2 which is associated with the mobile terminalB 402-2 are the same processing except omitting the processing of preparing for the voice recognition service of the speech of the userB 401-2. In other words, for example, the conversation establishment request S421 associated with the mobile terminalA and the conversation establishment request S421-2 associated with the mobile terminalB are the same processing. If the processing in S420 to S450 which is associated with the mobile terminalA 402 and the processing in S420-2 to S450-2 which is associated with the mobile terminalB 402-2 are separated in time, for example, the processing of preparing for the voice recognition service for the speech of the userB 401-2 may be executed again.

As shown in FIG. 4B, speech (S440) of the userA 401 of the mobile terminalA 402 and speech (S440-2) of the userB 401-2 of the mobile terminalB 402-2 are subjected to the voice recognition (S443 and S443-2) and the response generation (S446 and S446-2), independently, in order of making speech.

Thus, if a plurality of mobile terminals are connected to the interactive electronic device control system, the voice data (S441 and S441-2) input at arbitrary timing from the respective mobile terminals (mobile terminalA 402 and mobile terminalB 402-2) are subjected to the voice recognition (S443 and S443-2) independently by a voice recognition processor 505. The voice recognition processor 405 generates the responses based on the contents obtained by recognizing the respective input voice data (S446 and S446-2). The generated responses are sent to the respective mobile terminals (402 and 402-2) to which the voice data are input, from the interactive electronic device 404 (S449 and S449-2).

As explained above, if each of the owners of a plurality of mobile terminals speaks, the speaker can speak at arbitrary timing without considering the timing at which the owner of the other mobile terminal speaks, and can speak at arbitrary timing from any location. Convenience for each of the users of the mobile terminals to access the interactive electronic device control system is thereby improved remarkably.

In the example shown in FIG. 4A, FIG. 4B, and FIG. 4C, each of the responses generated by the voice recognition for the voice data input from a plurality of mobile terminals is sent to the mobile terminal to which the music data has been input, but the voice recognition is not limited to this. For example, it is assumed that plurality of mobile terminals request the voice recognition by tapping the voice recognition icon. In this case, each of the responses generated by the voice recognition for the voice data input from the respective mobile terminals may be sent to all of the mobile terminals requesting the voice recognition. In the example shown in FIG. 4A, FIG. 4B, and FIG. 4C, the mobile terminalB 402-2 starts request for the voice recognition (S420-2) at the timing immediately after the mobile terminalA 402 starts request for the voice recognition (S420). In this case, the response to the mobile terminalA 402 may be sent not only to the mobile terminalA 402 (S449), but also to the mobile terminalB 402-2. Similarly, the response to the mobile terminalB 402-2 may be sent not only to the mobile terminalB 402-2 (S449-2), but also to the mobile terminalA 402.

The type of each of the responses generated by the voice recognition for the voice data input from a plurality of mobile terminals may be any one of the response made by the voice data and the responses made by the command, in accordance with the content of the voice data input from each of the mobile terminals.

Third Embodiment

The interactive electronic device control system according to the Third Embodiment is an interactive electronic device control system in which, for each account used by a mobile terminal accessing the interactive electronic device control system, the type of a device controlled in accordance with voice data input from the mobile terminal can be changed and, even if the same device is controlled, a control content can be changed.

Information on the devices which can be controlled for each account is managed by an interactive electronic device 110 and stored in account management area 111-12. The interactive electronic device 110 changes the device which can be controlled by the account which an accessing mobile terminal 101 has used. In addition, the information on the device which can be controlled for each account can also be watched by operating the interactive electronic device 110.

FIG. 5A is a table showing association of devices controllable in accordance with the voice data input from the mobile terminal with each account. The information of the table is stored in the account management area 111-12 and can be watched by operating an interactive electronic device 110.

In FIG. 5A, for example, devices which the user of a mobile terminal 101 accessing the interactive electronic device control system with account a_aaaa@xmail.com speaks, and can control speech are TV (reserve recording), air-conditioner, opening and closing of entrance, and supply hot water (bath). Similarly, devices which the user of a mobile terminal accessing the interactive electronic device control system with account b_aaaa@xmail.com speaks and can control are TV (reserve recording) and air-conditioner. In addition, the user of a mobile terminal accessing the interactive electronic device control system with account d_aaaa@xmail.com can control no devices by speech.

FIG. 5B is a table showing association of functions which can be controlled by the same device in accordance with the voice data input from the mobile terminal 101 with each account. The information of the table is stored in the account management area 111-12 and can be watched by operating an interactive electronic device 110.

In FIG. 5B, for example, the user of the mobile terminal 101 accessing the interactive electronic device control system with account a_aaaa@xmail.com speaks, and can control a function of TV (reserve recording) of the video recording/reproducing device 132, such that all of the programs can be reserved (reserved programs can also be re-reserved (rewritten)). In addition, the user of the mobile terminal accessing the interactive electronic device control system with account d_aaaa@xmail.com cannot control TV (reserve recording) of the video recording/reproducing device 132 by speech.

FIG. 5C is a table showing association of output destination of response to the voice data input from the mobile terminal with each account. The information of the table is stored in the account management area 111-12 and can be watched by operating an interactive electronic device 110.

As explained above, if the response is a response made by the voice data, the response is basically output to the speaker managed by the mobile terminal 101 comprising the microphone which has collected the user's speech, but the speaker of the output destination can be changed.

In FIG. 5C, for example, the mobile terminal 101 accessing the interactive electronic device control system with account a_aaaa@xmail.com outputs the response to the only speaker managed by the mobile terminal 101 comprising the microphone which has collected the user's speech. In addition, the mobile terminal 101 accessing the interactive electronic device control system with account d_aaaa@xmail.com outputs the response to the speaker managed by the mobile terminal 101 comprising the microphone which has collected the user's speech, and also outputs the response to the speaker managed by the interactive electronic terminal 110.

In addition, the mobile terminal 101 accessing the interactive electronic device control system with account b_aaaa@xmail.com outputs the response to the speaker managed by the mobile terminal 101 comprising the microphone which has collected the user's speech and, if the response is the response made by the command, reads and outputs the content of the response made by the command by voice. For example, reading by voice the content of the response made by the command is very convenient for aged persons.

As explained above, the interactive electronic device control system of the Third Embodiment can change the controllable device or the controllable content in the same device or output destination, by the account used by the mobile terminal which has accessed the system.

Fourth Embodiment

The interactive electronic device control system according to the Fourth Embodiment is an interactive electronic device control system in which authority can be set for each account used by a mobile terminal accessing the interactive electronic device control system. In addition, the interactive electronic device control system can change the controllable device or the controllable content in the same device, in accordance with set authority.

Authority can be further set at the mobile terminal registered in the procedure shown in FIG. 2. For example, a plurality of types of authority such as Administrator (Admini), Native1, Native2, and Guest may be set. The authority may be used to determine the type of the controllable device by, for example, the response made by the command. In addition, the authority may be used to change the controllable content in the same device.

For example, Administrator is the authority which can control the device in the widest range. Native is the authority assigned to the account owned by family living in the house 105. This is the authority which can control the devices Guest is the authority assigned to the account owned by a person other than family living in the house 105. Native may be divided into Native1 and Native2, and the range in which the devices can be controlled may be changed. Native2 may be assigned to, for example, a child or a family member who stays a boarding house in ordinary days and comes home in the weekend.

The set authority is managed by the interactive electronic device 110, and the interactive electronic device 110 changes the controllable device with authority.

Information on the devices which can be controlled with authority is managed by the interactive electronic device 110 and stored in account management area 111-12. In addition, the information on the controllable devices can also be watched by operating the interactive electronic device 110.

FIG. 6A is a table showing association of devices controllable in accordance with the voice data input from the mobile terminal with each authority. The information of the table is stored in the account management area 111-12 and can be watched by operating an interactive electronic device 110.

For example, the mobile terminal 101 accessing the interactive electronic device control system with account a_aaaa@xmail.com is assigned authority Admini, and the devices which the user can control by speech are TV (reserve recording), air-conditioner, opening and closing of entrance, and supply hot water (bath). Similarly, the mobile terminal 101 accessing the interactive electronic device control system with account b_aaaa@xmail.com is assigned authority Native1, and the devices which the user can control by speech are TV (reserve recording) and air-conditioner. In addition, the mobile terminal 101 accessing the interactive electronic device control system with account d_aaaa@xmail.com is assigned authority Guest, and no devices can be controlled by the user by speech.

FIG. 6B is a table showing association of functions which can be controlled by the same device in accordance with the voice data input from the mobile terminal with each authority. The information of the table is stored in the account management area 111-12 and can be watched by operating an interactive electronic device 110.

For example, the mobile terminal 101 accessing the interactive electronic device control system with account a_aaaa@xmail.com is assigned authority Admini and, if the user controls a function of TV (reserve recording) of the video recording/reproducing device 132 by voice, all of the programs can be reserved (and reserved programs can be re-reserved (rewritten)). In addition, the mobile terminal 101 accessing the interactive electronic device control system with account d_aaaa@xmail.com is assigned authority Guest, and the user cannot control the function of TV (reserve recording) of the video recording/reproducing device 132 by speech.

As explained above, the interactive electronic device control system of the Fourth Embodiment can change the devices which can be controlled for each authority by the interactive electronic device 110 or the controllable contents in the same device. In addition, the device control does not need to be set for each mobile terminal accessing the interactive electronic device control system by managing the authority, and the device control can easily be set for each mobile terminal. For example, in a case where a mobile terminal owned by a friend coming home is set to access the interactive electronic device control system, if the authority is set to, for example, Guest, inconvenience in settings of the device control can be eliminated since the devices which can be controlled by authority Guest have been set.

Fifth Embodiment

The interactive electronic device control system according to the Fifth Embodiment is an interactive electronic device control system in which when statuses of devices which can be controlled by a mobile terminal accessing the interactive electronic device control system are displayed on the display screen, contents which can be displayed are different for each account.

The devices which can be controlled by the interactive electronic device control system are, for example, devices mounted in rooms Living, Kitchen, and Bed Room.

A mobile terminal 101 accessing the interactive electronic device control system with account a_aaaa@xmail.com can control the devices mounted in the respective rooms, Living, Kitchen, and Bed Room, of the devices which can be controlled by the interactive electronic device control system. In addition, the mobile terminal 101 accessing the interactive electronic device control system with account b_aaaa@xmail.com can control several devices mounted in Living, and cannot control the devices in the other rooms.

FIG. 7A shows an example of display of controllable devices displayed on the display screen for each account used by the mobile terminal accessing the interactive electronic device control system. FIG. 7A shows an example of display of controllable devices displayed on the display screen of the mobile terminal 101 using account a_aaaa@xmail.com.

FIG. 7A(a) shows an example of displaying statuses of the devices mounted in Living, on the display screen of the mobile terminal 101 using account a_aaaa@xmail.com. FIG. 7A(b) shows an example of displaying statuses of the devices mounted in Kitchen, on the display screen of the mobile terminal 101. In addition, FIG. 7A(c) shows an example of displaying statuses of the devices mounted in Bed Room, on the display screen of the mobile terminal 101.

On the display screen, icons linked to the control screens of respective controllable devices are displayed. For example, Overhead icon 701 is linked to the control screen of Overhead device. In addition, Floor Lamp icon 702 is linked to the control screen of Floor Lamp device. Humidity icon 704 is linked to the control screen of Humidity device. Brightness icon 705 is linked to the control screen of Brightness device. Ceiling Fans icon 708 is linked to the control screen of Ceiling Fans device. Door Lock icon 709 is linked to the control screen of Door Lock device. If the user of the mobile terminal 101 taps these icons, the display screen transitions to the control screens of the respective devices.

The display contents of the respective display screens shown in FIG. 7A(a), FIG. 7A(b), and FIG. 7A(c) can be changed by, for example, laterally swiping the display screen area of the mobile terminal 101.

Figure 7B:
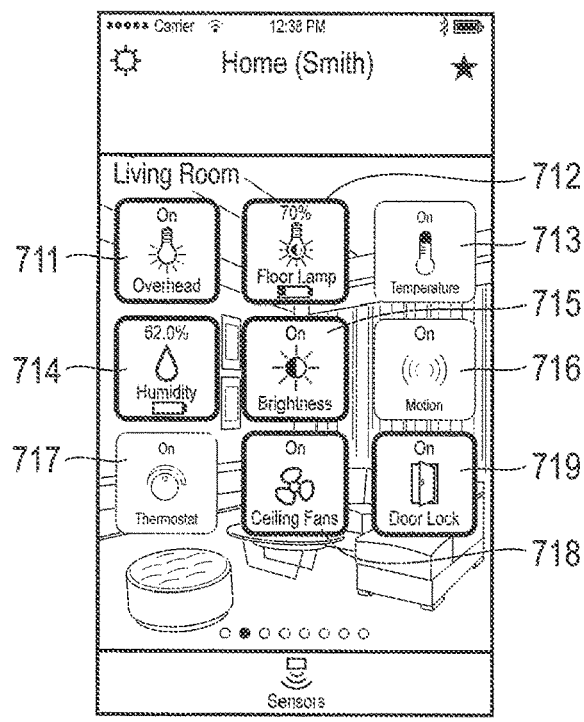
FIG. 7B is an illustration showing another example of display of controllable devices displayed on a display screen of a mobile terminal for each account used by the mobile terminal accessing the interactive electronic device control system.

In contrast, FIG. 7B shows the statuses of the devices mounted in Living displayed in the display screen of the mobile terminal 101 accessing the interactive electronic device control system with account b_aaaa@xmail.com. The statuses of the devices mounted in Living alone are displayed in the display screen of the mobile terminal 101 accessing the interactive electronic device control system with account b_aaaa@xmail.com. Therefore, for example, the display screen of the mobile terminal 101 is not changed to the display of the display screen of the statuses of the devices mounted in Kitchen and Bed Room even if the display screen area is swiped laterally.

Furthermore, it is assumed that the devices which can be controlled to operate by the mobile terminal 101 accessing the interactive electronic device control system with account b_aaaa@xmail.com are, for example, a device of Overhead icon 711, a device of Floor Lamp icon 712, a device of Humidity icon 714, a device of Brightness icon 715, a device of Ceiling Fans icon 718, and a device of Door Lock icon 719. It is also assumed that operations of a device of Temperature icon 713, a device of Motion icon 716, and a device of Thermostat icon 717 cannot be controlled by the mobile terminal 101, but the mobile terminal 101 can confirm the operated statuses of the respective devices.

In this case, it may be shown to the user that, for example, the icons of controllable devices, Overhead icon 711, Floor Lamp icon 712, Humidity icon 714, Brightness icon 715, Ceiling Fans icon 718, and Door Lock icon 719, of the icons of the devices displayed on the display screen of the mobile terminal 101, can be controlled, by emphasizing outlines of the icons. In addition, for example, outlines of the icons of the devices which cannot be controlled but can be confirmed with respect to operated status, Temperature icon 713, Motion icon 716, and Thermostat icon 717 cannot be blurred or controlled, but it may be shown to the user that their operated statuses can be confirmed.

Figure 7C:
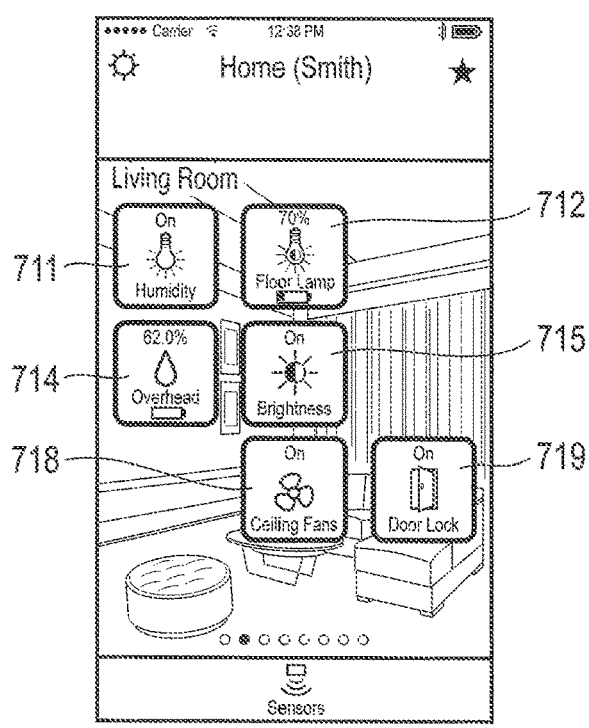
FIG. 7C is an illustration showing yet another example of display of controllable devices displayed on a display screen of a mobile terminal for each account used by the mobile terminal accessing the interactive electronic device control system.

FIG. 7C shows another example showing the statuses of the devices mounted in Living displayed in the display screen of the mobile terminal 101 accessing the interactive electronic device control system with account b_aaaa@xmail.com.

On the display screen of the mobile terminal 101 accessing the interactive electronic device control system with account b_aaaa@xmail.com, only icons of the controllable devices, Overhead icon 711, Floor Lamp icon 712, Humidity icon 714, Brightness icon 715, Ceiling Fans icon 718, and Door Lock icon 719 may be displayed.

In the examples shown in FIG. 7A, FIG. 7B, and FIG. 7C, the display contents are changed for each account to display on the display screen the statuses of the devices which can be controlled by the mobile terminal accessing the interactive electronic device control system but, besides these, the display contents displayed on the display screen of the mobile terminal may be changed for each authority.

As shown in the example shown in FIG. 5A to FIG. 5C, the information on the devices which can be controlled for each account is managed by the interactive electronic device 110. Therefore, each mobile terminal can control the display contents of the controllable devices displayed on the display screen as shown in, for example, FIG. 7A to FIG. 7C, by acquiring the information on the controllable devices at each of the accounts from the interactive electronic device 110.

Thus, since the mobile terminal accessing the interactive electronic device control system can change the display contents of display relating to the controllable devices, for each account to be used, the user can easily confirm the controllable devices by the own mobile terminal. Convenience for the user of the mobile terminal to access the interactive electronic device control system by the mobile terminal is thereby improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary. In addition, even if a claim is expressed as control logic, a program including an instruction to urge a computer to be executed, or a computer-readable storage medium storing the instruction, the device of the embodiments is applied to the claim. In addition, the names and terms are not limited and, if alternative expressions indicate substantially the same contents and the same gist, they are included in the invention.

What is claimed is:

1. An interactive electronic device control system comprising:

an interactive electronic device that sends input voice data to a voice recognition service server and receives a response generated based at least in part on a result of recognizing the voice data by the voice recognition service server; and an authentication manager that authenticates a mobile terminal connected to the interactive electronic device via a network as an authenticated user, wherein the interactive electronic device sends first voice data received at a microphone of the interactive electronic device to the voice recognition service server to recognize the first voice data, and sends second voice data received from the mobile terminal authenticated as the authenticated user by the authentication manager via the network to the voice recognition service server to recognize the second voice data;

wherein the voice recognition service server recognizes the first voice data sent from the interactive electronic device and received at the microphone of the interactive electronic device to the interactive electronic device at a first timing, and the second voice data received from the mobile terminal to the interactive electronic device via the network at a second timing, wherein the voice recognition service server recognizes the first voice data and the second voice data independently of each other.

2. The interactive electronic device control system of claim 1, wherein the voice recognition service server forms a first response corresponding to the first voice data and a second response corresponding to the second voice data independently of each other as a result of recognizing the first voice data sent from the interactive electronic device and received at the microphone of the interactive electronic device to the interactive electronic device at the first timing and the second voice data received from the mobile terminal to the interactive electronic device via the network at the second timing, wherein the voice recognition service server recognizes the first voice data and the second voice data independently of each other.

3. The interactive electronic device control system of claim 2, wherein
each of the first response and the second response comprises at least one of a third response comprising voice data, or a third response comprising a command to operate a device controlled by the interactive electronic device.

4. The interactive electronic device control system of claim 1, wherein
the authentication manager authenticates a plurality of mobile terminals as authenticated users, wherein the plurality of mobile terminals are connected to the interactive electronic device to send the second voice data via the network.

5. The interactive electronic device control system of claim 1, wherein
the interactive electronic device changes a type of a device controllable for the mobile terminal or a content of the control, based at least in part on an account of the mobile terminal connected to send the second voice data via the network, wherein the account is used at a connection between the mobile terminal and the interactive electronic device.

6. The interactive electronic device control system of claim 1, wherein
the interactive electronic device changes a type of a device controllable for the mobile terminal or a content of the control, based at least in part on authority assigned to an account of the mobile terminal connected to send the second voice data via the network, wherein the authority is used at a connection between the mobile terminal and the interactive electronic device.

* * * * *